United States Patent
Nozawa

(10) Patent No.: US 7,167,179 B2
(45) Date of Patent: Jan. 23, 2007

(54) IMAGE SENSING APPARATUS, IMAGE SYNTHESIZING METHOD, IMAGE PROCESSING APPARATUS, AND IMAGE PROCESSING METHOD

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 09/732,368

(22) Filed: Dec. 7, 2000

(65) Prior Publication Data

US 2001/0013869 A1 Aug. 16, 2001

(30) Foreign Application Priority Data

Dec. 9, 1999 (JP) ............................................. 11-350466
Nov. 22, 2000 (JP) ........................................ 2000-356145

(51) Int. Cl.
*G06T 15/00* (2006.01)

(52) U.S. Cl. ...................................................... 345/473

(58) Field of Classification Search ................. 345/419, 345/629, 473, 474, 475; 382/282, 291, 295
See application file for complete search history.

(56) References Cited

U.S. PATENT DOCUMENTS

| | | | | |
|---|---|---|---|---|
| 5,479,597 | A | * | 12/1995 | Fellous ........................ 345/419 |
| 6,061,532 | A | * | 5/2000 | Bell ............................. 345/629 |
| 6,191,798 | B1 | * | 2/2001 | Handelman et al. ......... 345/473 |
| 6,232,965 | B1 | * | 5/2001 | Scott et al. ............... 715/500.1 |
| 6,281,904 | B1 | * | 8/2001 | Reinhardt et al. ........... 345/582 |
| 6,285,381 | B1 | * | 9/2001 | Sawano et al. .............. 345/582 |
| 6,288,727 | B1 | * | 9/2001 | Akemann ..................... 345/473 |
| 6,317,125 | B1 | * | 11/2001 | Persson ....................... 345/423 |
| 6,317,132 | B1 | * | 11/2001 | Perlin .......................... 345/475 |
| 6,377,281 | B1 | * | 4/2002 | Rosenbluth et al. ......... 345/700 |
| 6,400,374 | B1 | * | 6/2002 | Lanier .......................... 345/630 |
| 6,504,546 | B1 | * | 1/2003 | Cosatto et al. ............... 345/473 |
| 6,552,729 | B1 | * | 4/2003 | Di Bernardo et al. ....... 345/473 |

* cited by examiner

*Primary Examiner*—Phu K. Nguyen
(74) *Attorney, Agent, or Firm*—Morgan & Finnegan, L.L.P.

(57) ABSTRACT

An image sensing unit generates a video signal by image-sensing an object. A detecting unit detects a feature of a picture contained in the video signal. An animation generating unit generates animation data on the basis of the detected feature. The generated animation data is synthesized with the video signal by a synthesizing unit. The resultant data is recorded.

76 Claims, 20 Drawing Sheets

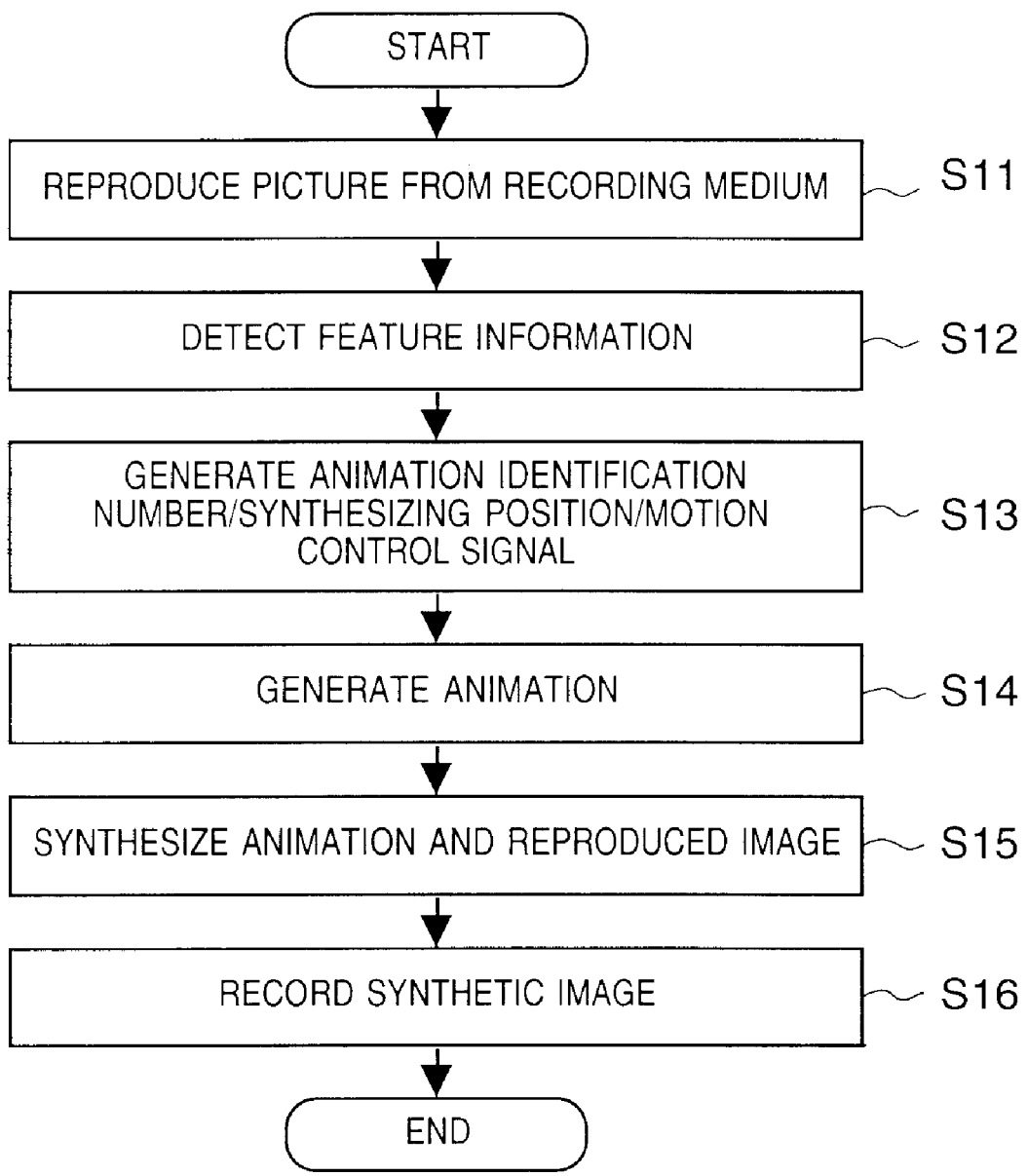

FIG. 18A

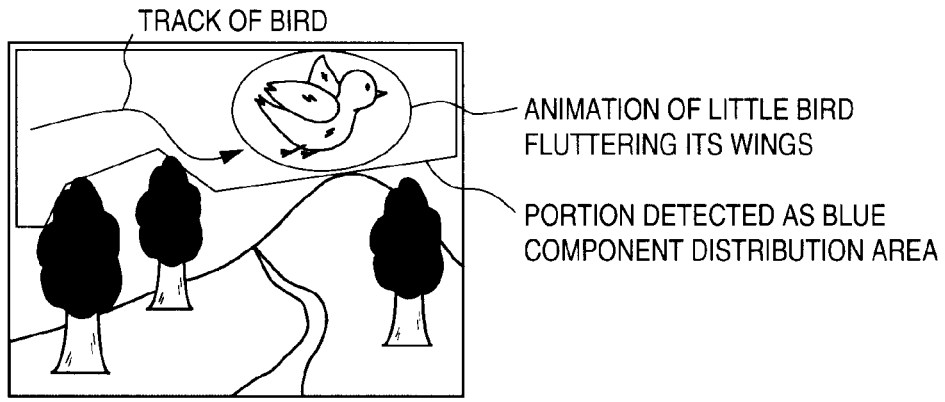

TRACK OF BIRD

ANIMATION OF LITTLE BIRD FLUTTERING ITS WINGS

PORTION DETECTED AS BLUE COMPONENT DISTRIBUTION AREA

FIG. 18B

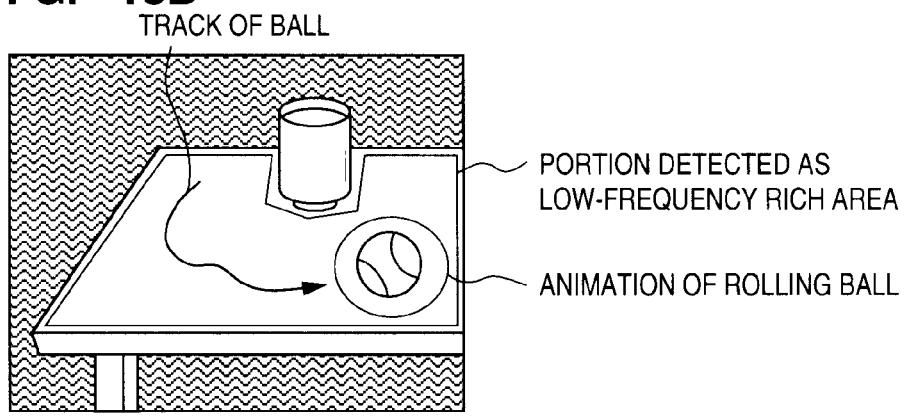

TRACK OF BALL

PORTION DETECTED AS LOW-FREQUENCY RICH AREA

ANIMATION OF ROLLING BALL

FIG. 18C

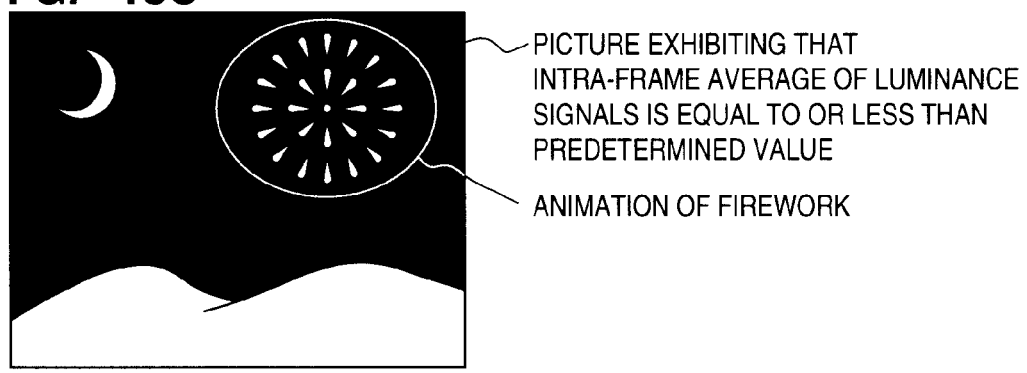

PICTURE EXHIBITING THAT INTRA-FRAME AVERAGE OF LUMINANCE SIGNALS IS EQUAL TO OR LESS THAN PREDETERMINED VALUE

ANIMATION OF FIREWORK

FIG. 18D

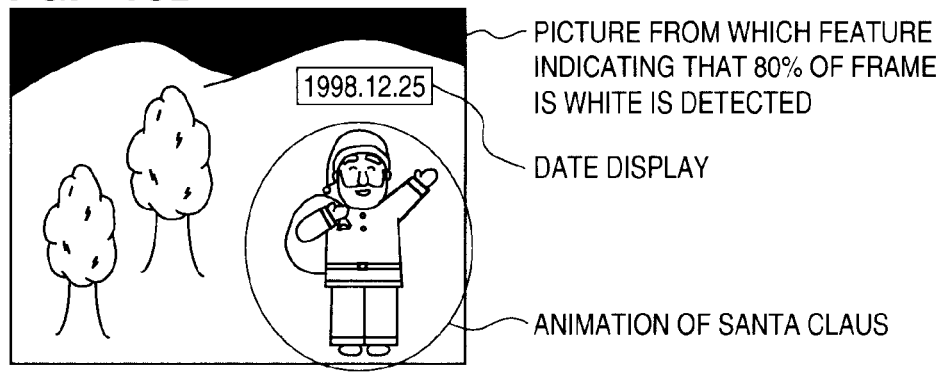

PICTURE FROM WHICH FEATURE INDICATING THAT 80% OF FRAME IS WHITE IS DETECTED

DATE DISPLAY

ANIMATION OF SANTA CLAUS

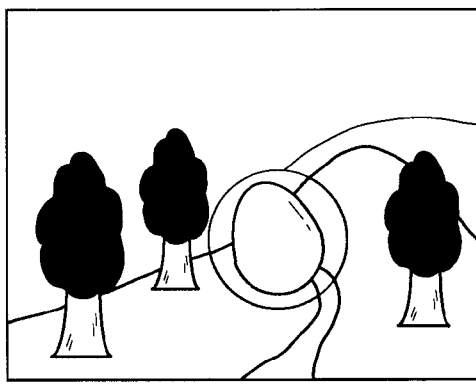
FIG. 19A — ANIMATION OF "EGG"
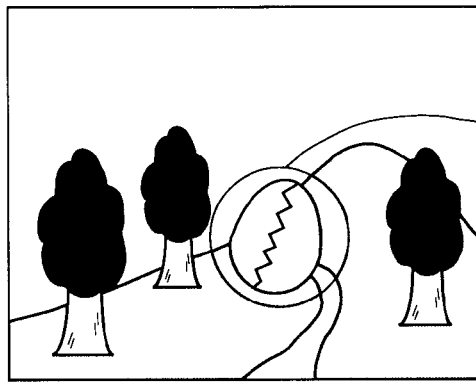
FIG. 19B — ANIMATION OF "CRACKED EGG"
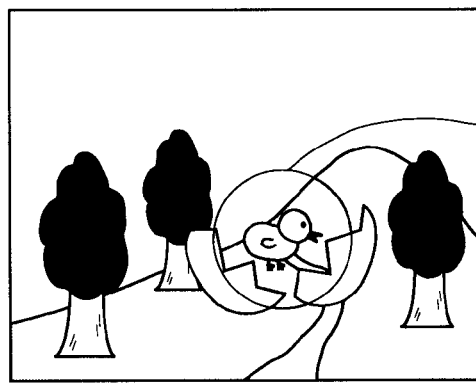
FIG. 19C — ANIMATION OF "CHICK THAT HAS HATCHED OUT"
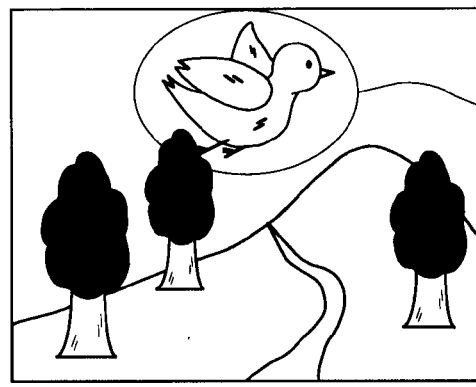
FIG. 19D — ANIMATION OF "GROWN BIRD"

IMAGE SENSING APPARATUS, IMAGE SYNTHESIZING METHOD, IMAGE PROCESSING APPARATUS, AND IMAGE PROCESSING METHOD

FIELD OF THE INVENTION

The present invention relates to an image sensing apparatus, image synthesizing method, imaging processing apparatus, and image processing method and, more particularly, to an image sensing apparatus, image synthesizing method, image processing apparatus, and image processing method, which add special effects to a video signal obtained by image-sensing an object.

BACKGROUND OF THE INVENTION

Recently, with an advance in digital signal processing techniques, a large amount of digital information such as moving image information, still image information, and sound information can be efficiently coded to be recorded on compact magnetic media and transmitted to communication media. Image sensing apparatuses capable of easily sensing high-quality pictures and quickly outputting the resultant information to information media by using such techniques have been developed.

FIG. 20 shows an example of the arrangement of a conventional image sensing apparatus having a character/graphic pattern synthesizing function. Referring to FIG. 20, reference numeral 901 denotes an image sensing unit; 902, a synthesizing unit; 903, a recording unit; 904, a character/graphic pattern generating unit; and 905, a control unit.

The operation of the image sensing apparatus having the above arrangement will be described.

First of all, the image sensing unit 901 generates a video signal by image-sensing an object and supplies it to the synthesizing unit 902. The control unit 905 supplies the identification numbers of a character and graphic pattern to be synthesized to the character/graphic pattern generating unit 904 in accordance with an instruction from a user. The character/graphic pattern generating unit 904 generates character and graphic pattern raster data in accordance with the supplied identification numbers, and supplies the data to the synthesizing unit 902. The synthesizing unit 902 generates a video signal by superimposing the character and graphic pattern raster data supplied from the character/graphic pattern generating unit 904 on the video signal supplied from the image sensing unit 901, and supplies the signal to the recording unit 903. The recording unit 903 records the video signal, supplied from the synthesizing unit 902, on an information medium. In general, a video signal has an enormous amount of data, and hence is often recorded on a recording medium after being data-compressed by a high-efficiency coding technique using discrete cosine transform or the like.

In the prior art described above, only simple character/graphic pattern synthesis can be performed in accordance with an instruction from the user. It is therefore difficult to provide special effects that entertain a user and a person who is image-sensed. To realize relatively sophisticated special effects by frequently switching characters and graphic patterns, the user must perform complicate operation.

SUMMARY OF THE INVENTION

The present invention has been made in consideration of the above problem, and has as its object to provide an image sensing apparatus, image synthesizing method, image processing apparatus, and image processing method, which can realize novel, entertaining image synthesizing effect with simple operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a flow chart showing the operation of an image sensing apparatus according to the ninth embodiment;

FIGS. 18A to 18D are views showing examples of how animations are produced in the present invention;

FIGS. 19A to 19D are views showing examples of how animations are produced in the present invention.

DETAILED DESCRIPTION OF THE PREFERRED EMBODIMENT

Preferred embodiments of the present invention will be described in detail below with reference to the accompanying drawings.

(First Embodiment)

Figure 1:
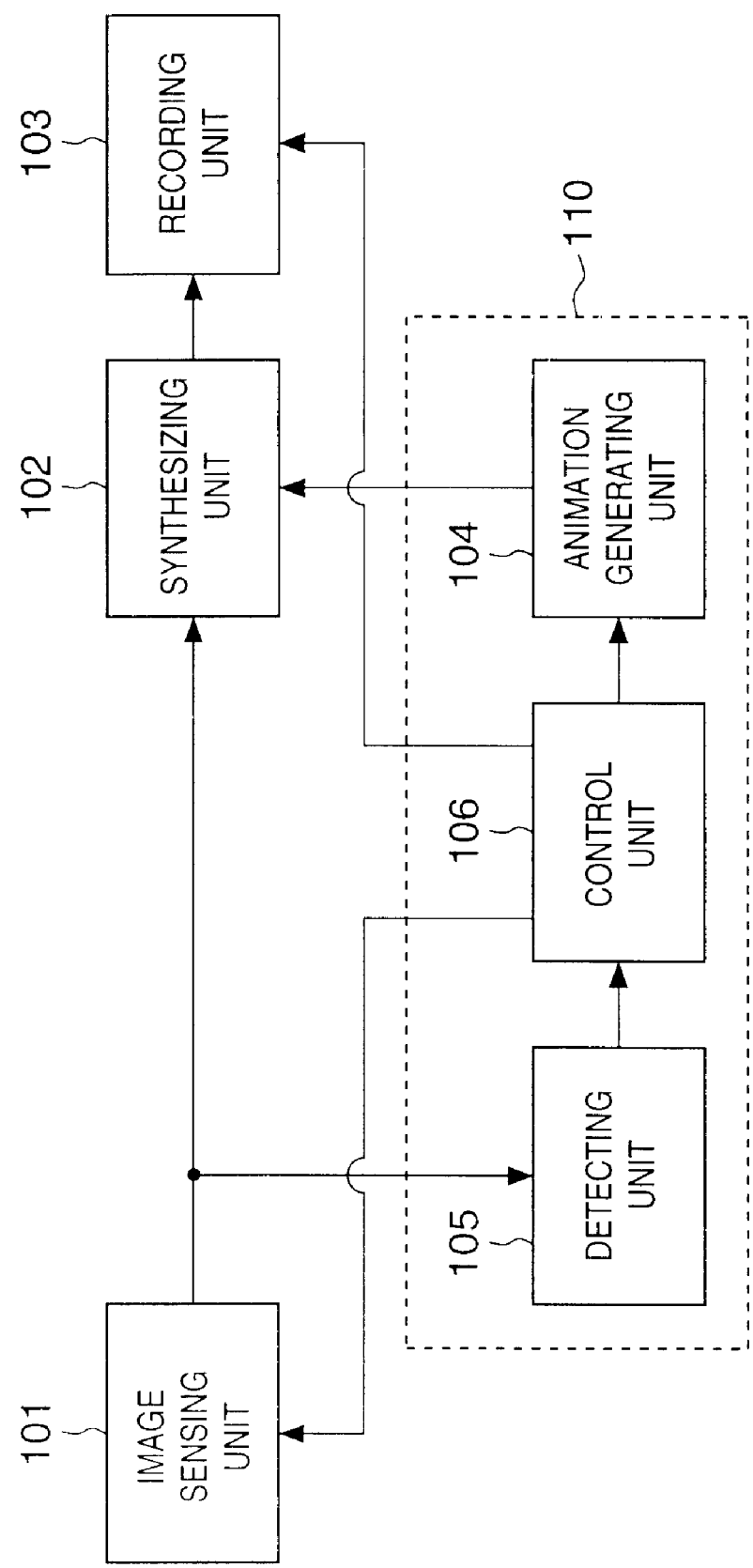
FIG. 1 is a block diagram showing the first embodiment of the present invention.

FIG. 1 is a block digram showing the arrangement of of image sensing apparatus according to the first embodiment of the present invention. The image sensing apparatus according to the first embodiment automatically generates an animation image corresponding to a picture obtained by image sensing, synthesizing the picture and animation image, and storing the resultant data.

Referring to FIG. 1, reference numeral 101 denotes an image sensing unit; 102, a synthesizing unit; 103, a recording unit; 104, an animation generating unit; 105, a detecting unit; and 106, a control unit.

Figure 10:
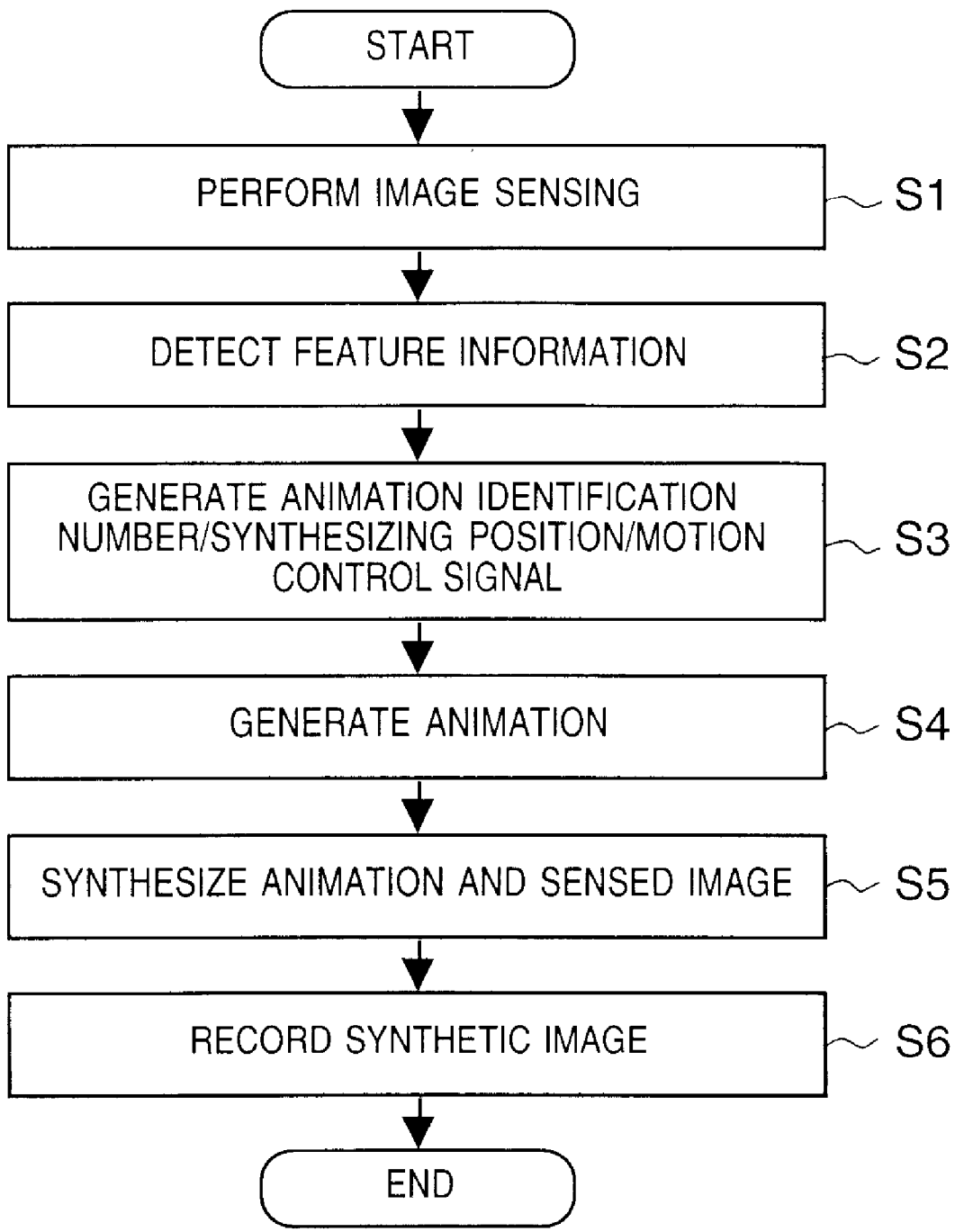
FIG. 10 is a flow chart showing the operation of an image sensing apparatus according to the first embodiment.

The operation of the image sensing apparatus having the arrangement shown in FIG. 1 will be described next. In this embodiment, the functions in a dashed line frame 110 are implemented by software on a processor (e.g., a microcomputer), and each processing unit outside the frame is controlled by signals from the processor. The operation of this apparatus will be described with reference to the processing flow of the processor indicated by the flow chart of FIG. 10.

In step S1, the image sensing unit 101 generates a video signal by image-sensing an object and supplies the signal to the synthesizing unit 102 and detecting unit 105. In step S2, the detecting unit 105 detects the feature information of the supplied video signal and supplies the information to the control unit 106.

The feature information in the first embodiment includes (a) the intra-frame average of luminance signals, (b) the intra-frame average of chrominance signals, (c) the intra-frame distribution of the luminance signals, (d) the intra-frame distribution of the chrominance signals, (e) the intra-frame distribution of low-frequency components, (f) the intra-frame distribution of high-frequency components, (g) the intra-frame distribution of edges, (h) a coordinate value exhibiting the highest correlation with respect to a specific pattern, and the like. Various other factors are conceivable. Any factor can be used as feature information in the present invention as long as it characterizes a video signal.

In the animation generating unit 104, pieces of information about a plurality of kinds of animations that can be identified by identification numbers are stored in advance. In the control unit 106, link information between the above feature information and the identification number of each animation information is stored. Upon receiving feature information from the detecting unit 105, in step S3, the control unit 106 generates the identification number of an animation image to be generated in accordance with the contents of the received information and a control signal for a position where the generated animation is synthesized with the picture and the motion of the animation, and supplies them to the animation generating unit 104.

If, for example, a blue component distribution is detected on an upper portion in a frame, the identification number of an animation of a bird that is fluttering its wings and a control signal designating an upper frame portion as a synthesizing position are supplied to the animation generating unit 104. In addition, the control unit 106 instructs animation control in accordance with feature information detected from the video signal on the basis of a predetermined control rule so as to produce an animation of a cat that nestles up to a flesh color portion, an animation of a ball that selectively rolls on a low-frequency rich portion, an animation of a firework that is set off when the intra-frame average of luminance signals is equal to or less than a predetermined value, or an animation of a balloon that follows the face of a child.

FIGS. 18A to 18D are views showing specific examples of how animations are produced. FIG. 18A shows an example of how a sky portion of a video signal is detected as a blue component distribution area and an animation of a little bird that is fluttering its wings is produced and synthesized with the detected sky portion. FIG. 18B shows an example of how a table of a video signal is detected as a low-frequency rich portion, and an animation of a ball that selectively rolls on this detected portion is produced and synthesized with the detected portion. FIG. 18C shows an example of how an animation of a firework is produced and synthesized when it is detected from a picture of a night view that the intra-frame average of luminance signals is equal to or less than a predetermined value.

In step S4, the animation generating unit 104 generates raster data of an animation in units of frames in accordance with a supplied control signal and supplies the data to the synthesizing unit 102. In step S5, the synthesizing unit 102 generates a video signal by superimposing the raster data of the animation supplied from the animation generating unit 104 on the video signal supplied from the image sensing unit 101, and supplies the signal to the recording unit 103. In step S6, the recording unit 103 records the video signal supplied from the synthesizing unit 102 on a recording medium.

Note that raster data is used as animation data in the first embodiment. However, vector data can also be generated as animation data.

According to the first embodiment as described above, type synthesizing position, motion, and the like, of an animation image to be synthesized are automatically generated in accordance with a video image. Thus, dynamic image synthesis is realized with simple operation.

(Second Embodiment)

Figure 2:
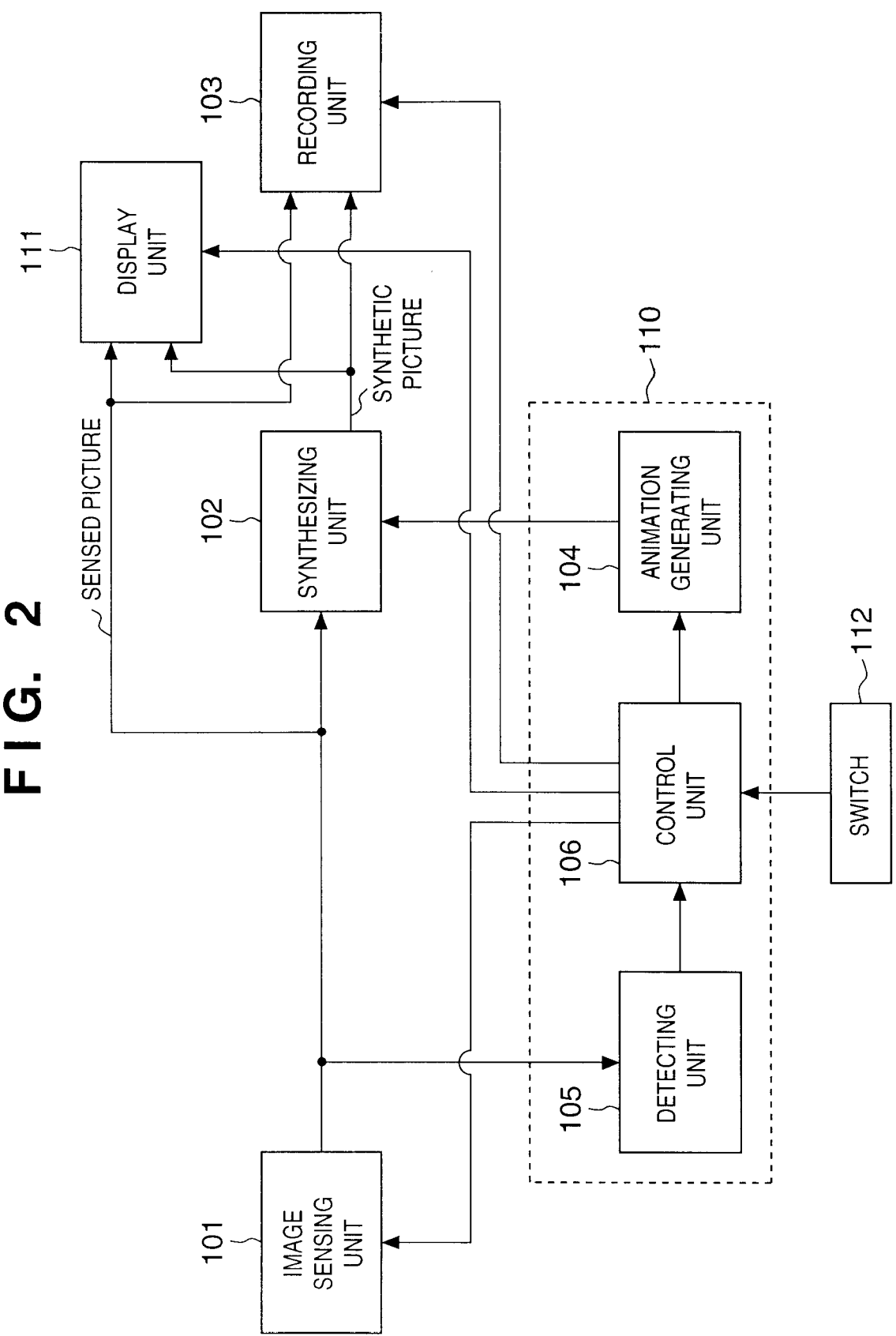
FIG. 2 is a block diagram showing the second embodiment of the present invention.
Figure 11:
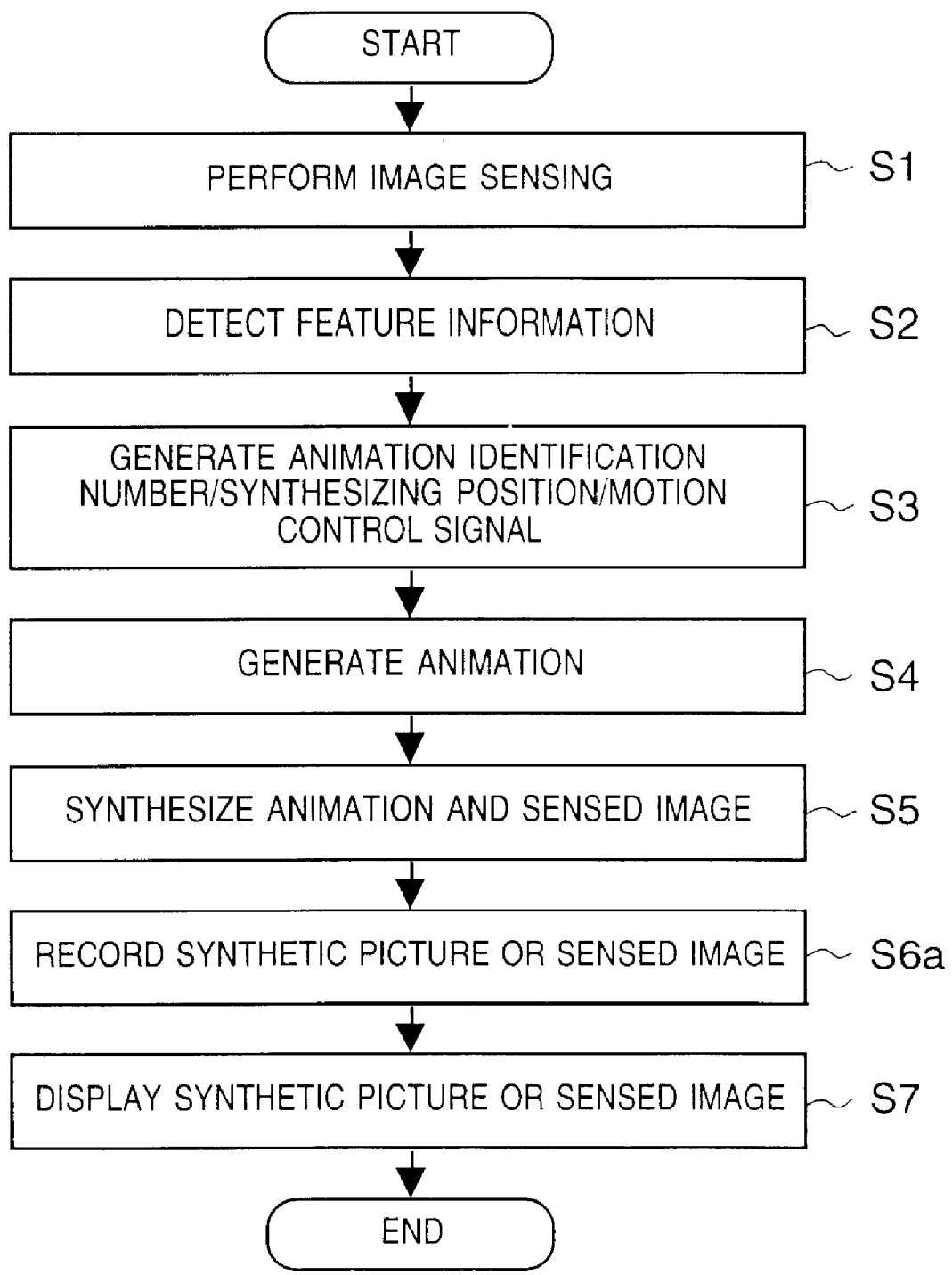
FIG. 11 is a flow chart showing the operation of an image sensing apparatus according to the second embodiment.

Such special effects may be inappropriate to recording or interfere with viewfinder display during image sensing operation depending on a target to be image-sensed. FIG. 2 shows an embodiment configured to enable/disable the effect of synthesis. In this embodiment, the functions within a dashed line frame 110 are implemented by software on a processor, and each processing block outside the frame is controlled by signals from the processor. The processing in this embodiment will therefore be described with reference to the flow chart of FIG. 11. The arrangement shown in FIG. 2 includes a display unit 111 and switch 112 in addition to the components of the arrangement shown in FIG. 1. Two video signals representing a picture obtained by image sensing and a synthetic picture obtained by the synthesis of the picture and data, are supplied to the display unit 111 and a recording unit 103. In step S6a, a control unit in the processor supplies the recording unit with a control signal indicating which one of the two pictures is to be recorded in accordance with the state of the switch 112 switched by external operation. Likewise, in step S7, the processor supplies the display unit with a control signal indicating which one of the two pictures is to be displayed.

(Third Embodiment)

Figure 3:
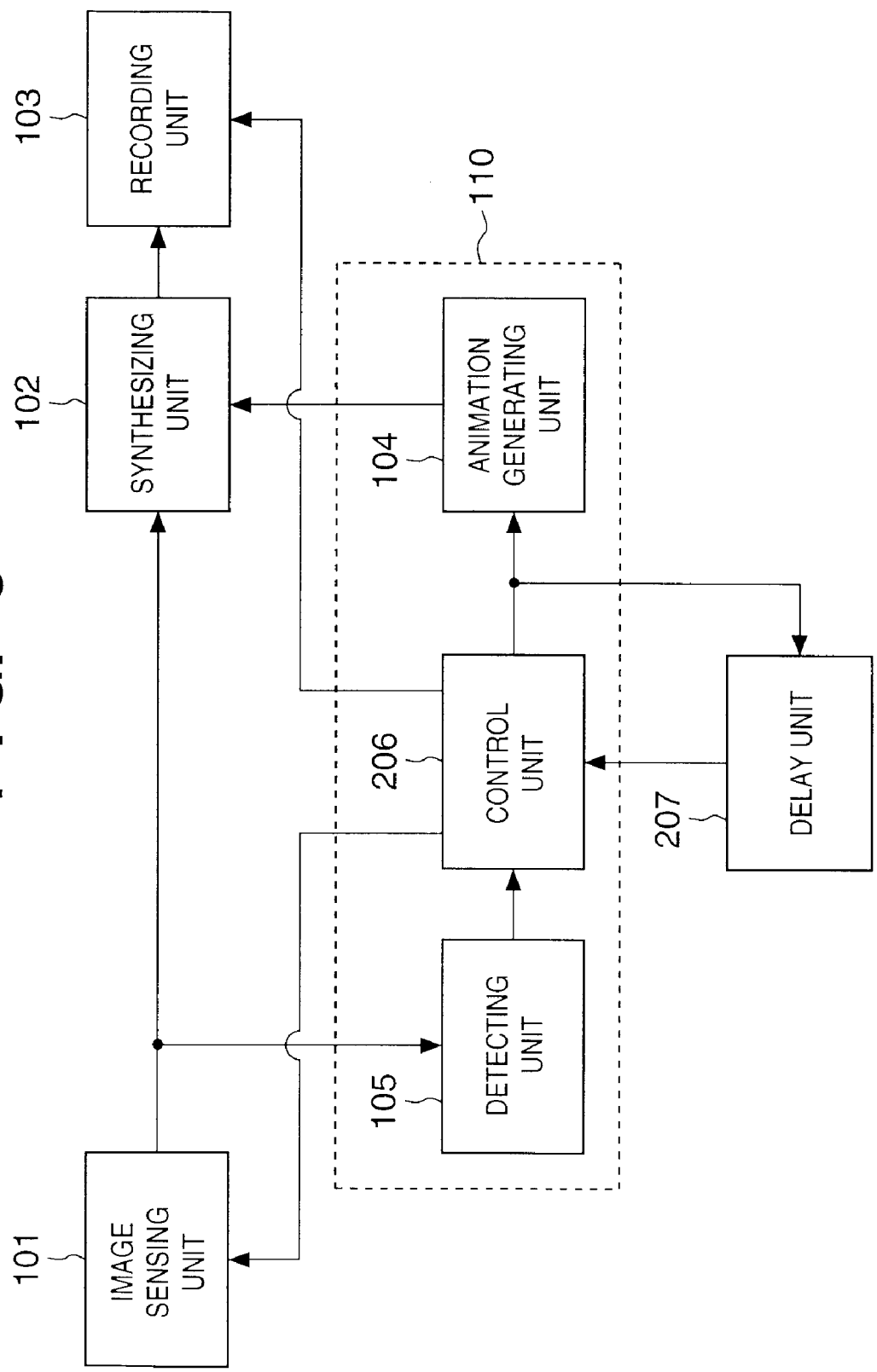
FIG. 3 is a block diagram showing the third embodiment of the present invention.

FIG. 3 is a block diagram showing the arrangement of an image sensing apparatus according to the third embodiment of the present invention.

Figure 12:
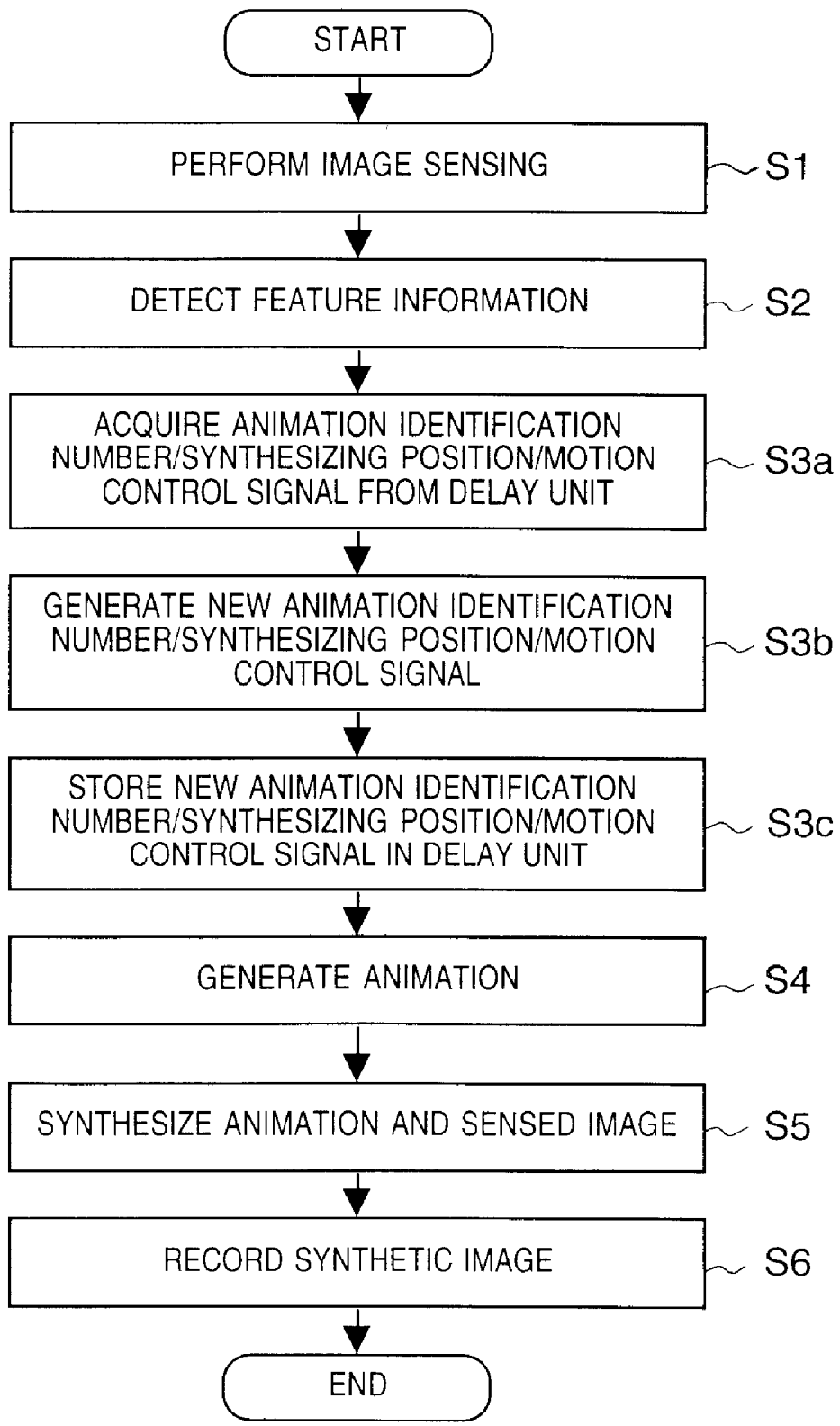
FIG. 12 is a flow chart showing the operation of an image sensing apparatus according to the third embodiment.

Referring to FIG. 3, reference numeral 101 denotes an image sensing unit; 102, a synthesizing unit; 103, a recording unit; 104, an animation generating unit; and 105, a detecting unit. These components operate in the same manner as in the first embodiment. The difference between the arrangement of the third embodiment and that of the first embodiment resides in a control unit 206 and delay unit 207. The functions within a dashed line frame 110 are implemented by software on a processor, and each processing block outside the frame is controlled by signals from the processor. The operation of an arrangement different from that in the first embodiment will be described with reference to the flow chart of FIG. 12.

A control signal output from the control unit 206 in the third embodiment is supplied to the animation generating unit 104 and fed back to the control unit 206 after being delayed by the delay unit 207. In step S2, the control unit 206 acquires feature information supplied from the detecting unit 105. In step S3a, the control unit 206 also acquires a past animation identification number/synthesizing position/motion control signal from the delay unit 207. The control unit 206 then determines a control signal to be output on the basis of the control signal and the feature information. More specifically, the control unit 206 generates a new control signal on the basis of information such as the animation image represented by the previously output control signal that was fed back and the display position in step S3b. The new control signal is stored in the delay unit in step S3c and used in the subsequent processing. Since a control signal is generated in this manner in consideration of a control process, an animation image can be gradually changed in animation synthesis in the third embodiment.

Assume that the animation image represented by a previously output control signal represents an "egg". In this case, if a control signal is generated to represent a "cracked egg" as the next animation image, an animation that depicts a chick hatching out and gradually growing can be produced. Such a special effect allows a user to enjoy breeding a virtual pet and also record synthetic pictures of the virtual pet and the breeder so as to generate a breeding record, thus implementing an entertaining image sensing apparatus.

FIGS. 19A to 19D are views showing an example of an animation that gradually changes in the present invention. This animation will be sequentially described. First of all, FIG. 19A shows a state wherein an animation of an "egg" in the initial state is generated. In the state shown in FIG. 19B, the animation changes from the "egg" to the "cracked egg". Referring to FIG. 19C, an animation of a "born chick" upon breaking of the "cracked egg" is generated. Referring to FIG. 19D, an animation of the "grown bird" is generated.

(Fourth Embodiment)

Figure 4:
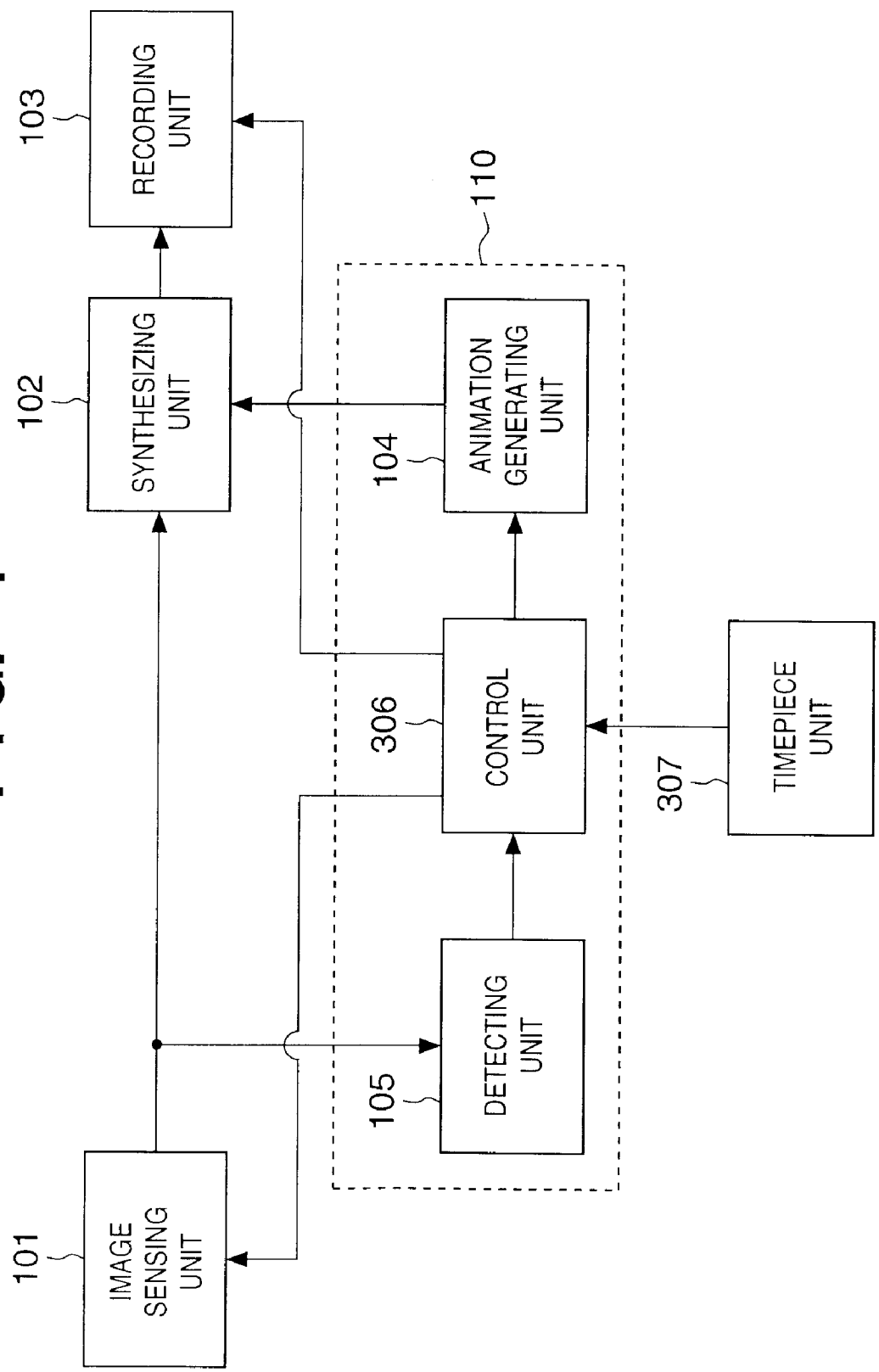
FIG. 4 is a block diagram showing the fourth embodiment of the present invention.

FIG. 4 is a block diagram showing the arrangement of an image sensing apparatus according to the fourth embodiment of the present invention.

Figure 13:
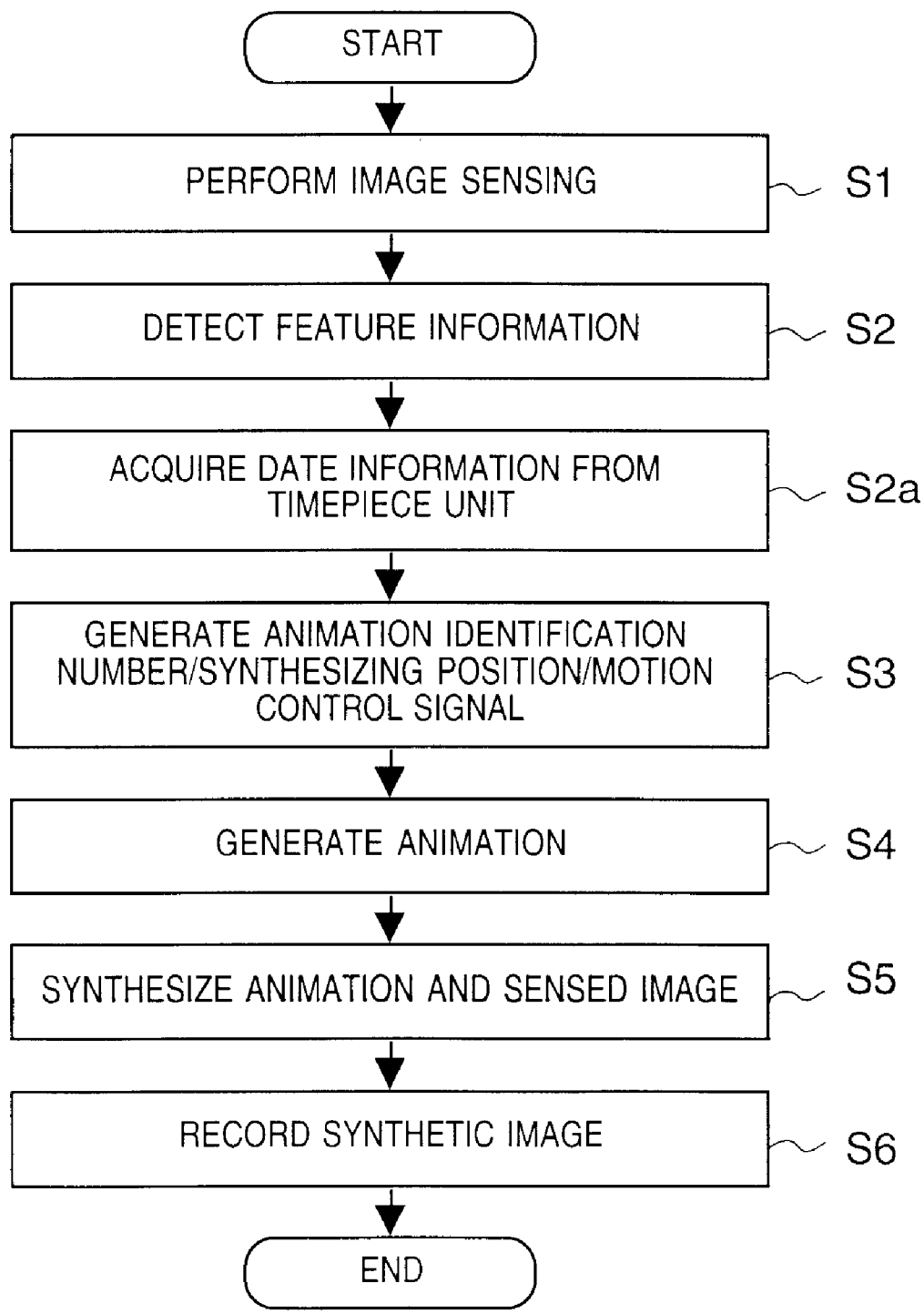
FIG. 13 is a flow chart showing the operation of an image sensing apparatus according to the fourth embodiment.

Referring to FIG. 4, reference numeral 101 denotes an image sensing unit; 102, a synthesizing unit; 103, a recording unit; 104, an animation generating unit; and 105, a detecting unit. These components operate in the same manner as in the first embodiment. The difference between the arrangement of the fourth embodiment and that of the first embodiment resides in a control unit 306 and timepiece unit 307. The functions within a dashed line frame 110 are implemented by software on a processor, and each processing block outside the frame is controlled by signals from the processor. The operation of an arrangement different from that in the first embodiment will be described with reference to the flow chart of FIG. 13.

The control unit 306 in the fourth embodiment acquires date information from the timepiece unit 307 in step S2a in addition to feature information supplied from the detecting unit 105 in step S2, and determines a control signal on the basis of the two pieces of information.

Assume that the control unit 306 has received feature information indicating that 80% of a frame is white and date information indicating Christmas as in the case shown in FIG. 18D. In this case, the control unit 306 performs control to supply the animation generating unit 104 with a control signal instructing to display an animation of Santa Claus.

(Fifth Embodiment)

Figure 5:
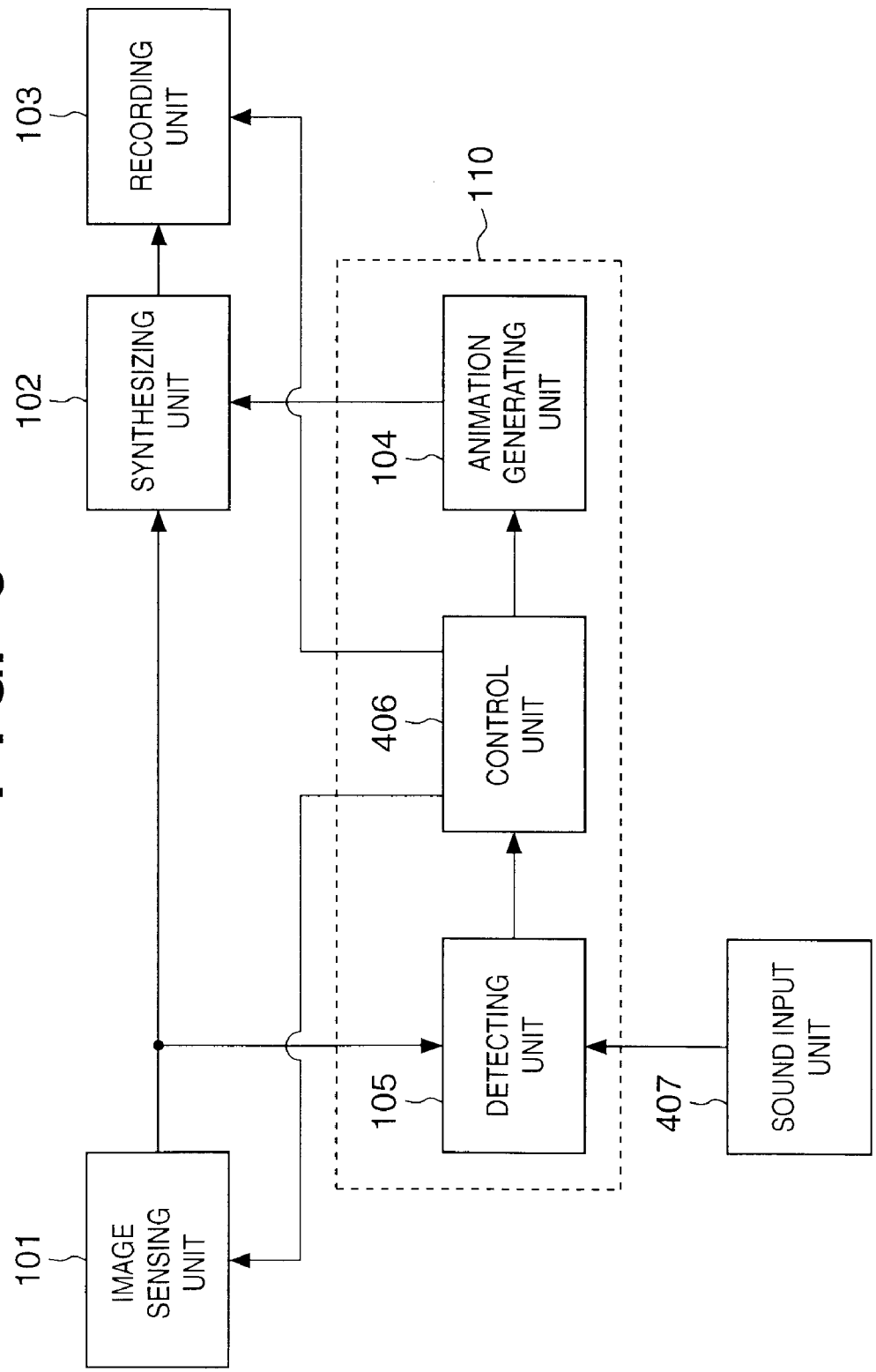
FIG. 5 is a block diagram showing the fifth embodiment of the present invention.

FIG. 5 is a block diagram showing the arrangement of an image sensing apparatus according to the fifth embodiment of the present invention.

Figure 14:
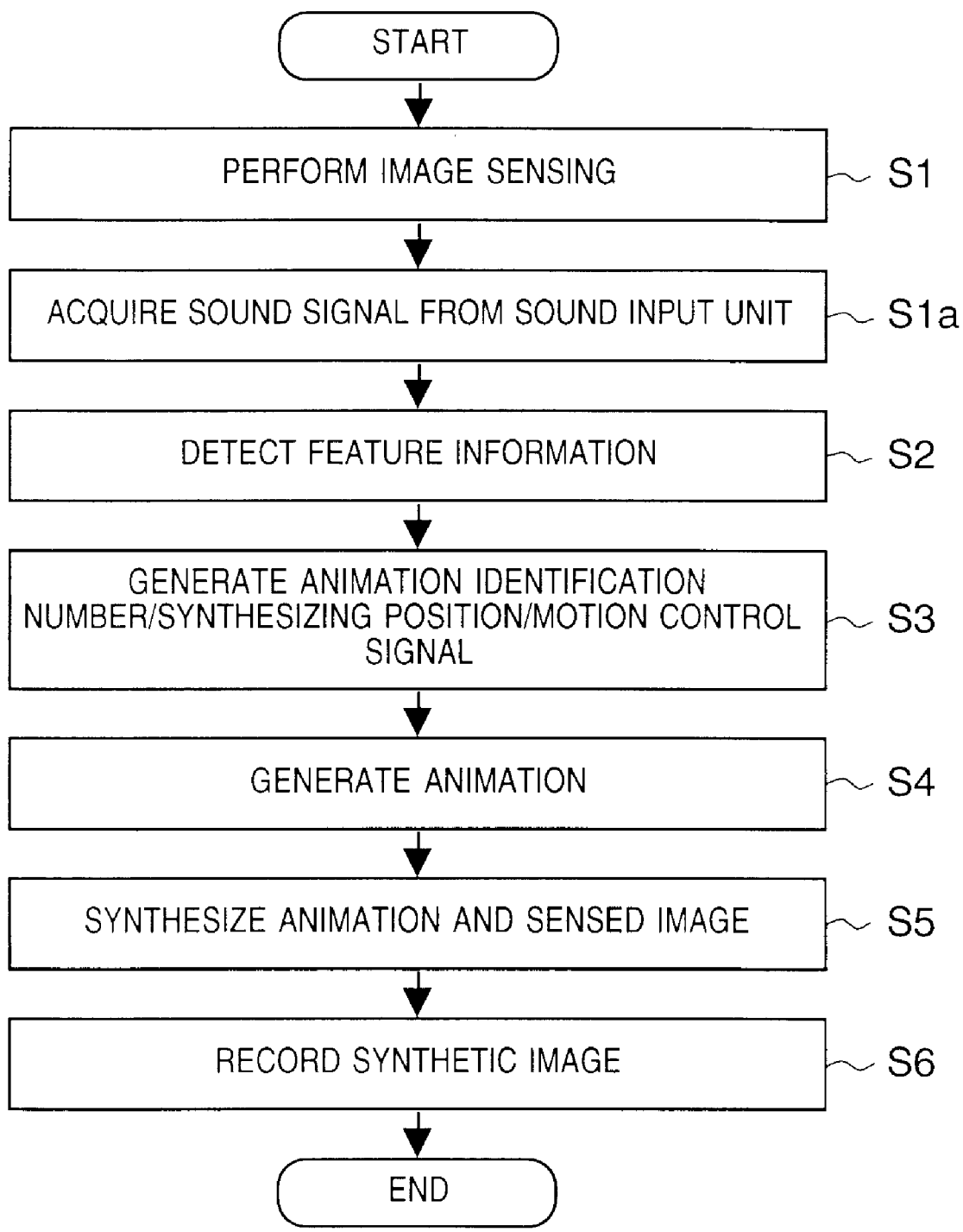
FIG. 14 is a flow chart showing the operation of an image sensing apparatus according to the fifth embodiment.

Referring to FIG. 5, reference numeral 101 denotes an image sensing unit; 102, a synthesizing unit; 103, a recording unit; 104, an animation generating unit; and 105, a detecting unit. These components operate in the same manner as in the first embodiment. The difference between the arrangement of the fifth embodiment and that of the first embodiment resides in a control unit 406 and sound input unit 407. The functions within a dashed line frame 110 are implemented by software on a processor, and each processing block outside the frame is controlled by signals from the processor. The operation of an arrangement different from that in the first embodiment will be described with reference to the flow chart of FIG. 14.

The control unit 406 in this fifth embodiment acquires a sound signal from the sound input unit 407 in step S1a in addition to a video signal supplied from the image sensing unit 101. The control unit 406 then detects a feature of the object and determines a control signal on the basis of the two signals.

Assume that the control unit 406 has received feature information indicating that the average luminance of a frame is equal to or less than a predetermined value and a sound signal substantially indicating the absence of sound. In this case, the control unit 406 performs control to supply the animation generating unit 104 with a control signal instructing to generate an animation of an owl. Although not shown, the animation generating unit 104 and synthesizing unit 102 generate and synthesize a sound as well as an image. If, for example, the song of the owl is synthesized together with an animation of the owl, a more amusing image synthesis effect can be realized.

(Sixth Embodiment)

Figure 6:
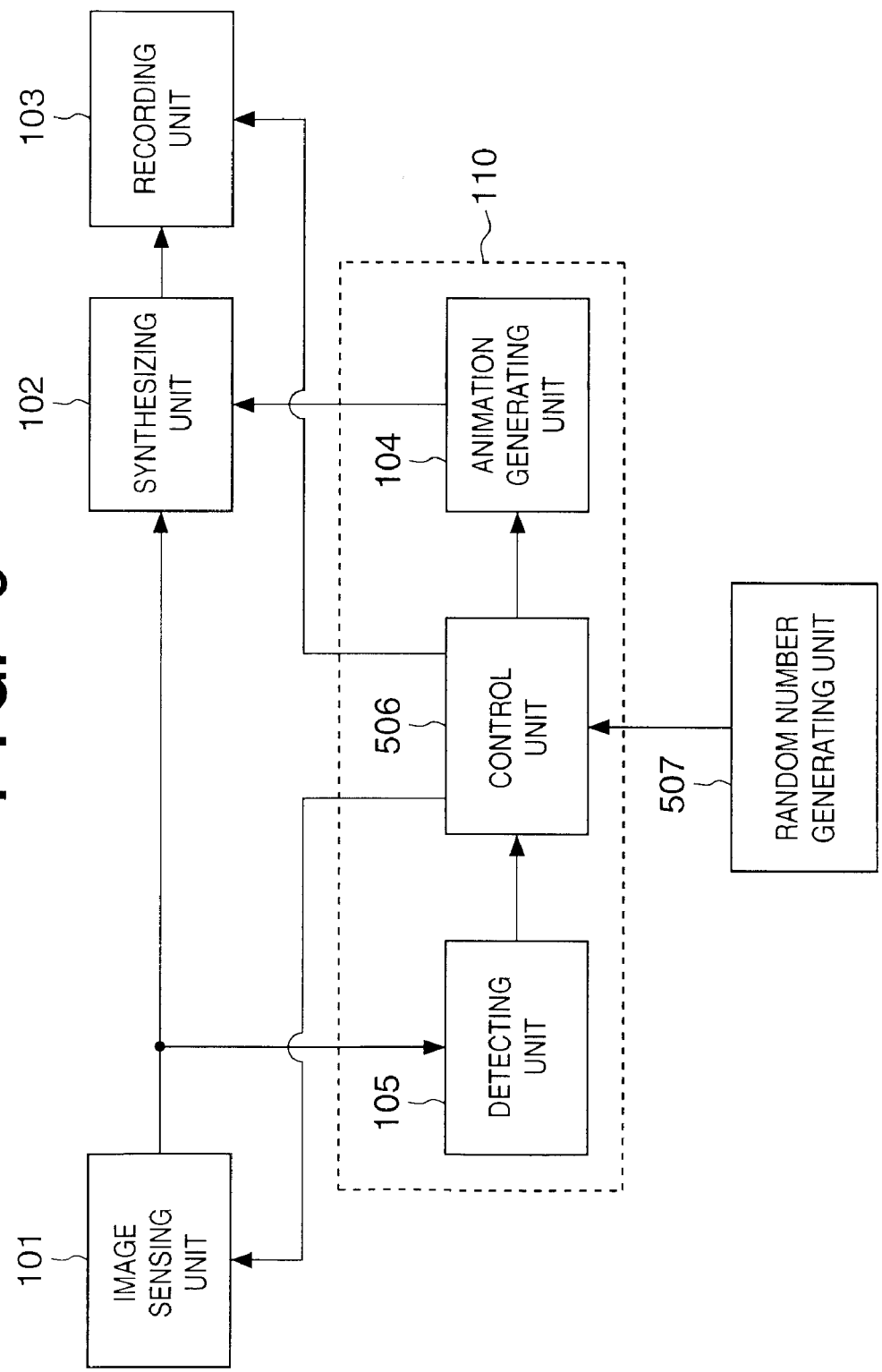
FIG. 6 is a block diagram showing the sixth embodiment of the present invention.

FIG. 6 is a block diagram showing the arrangement of an image sensing apparatus according to the sixth embodiment of the present invention.

Figure 15:
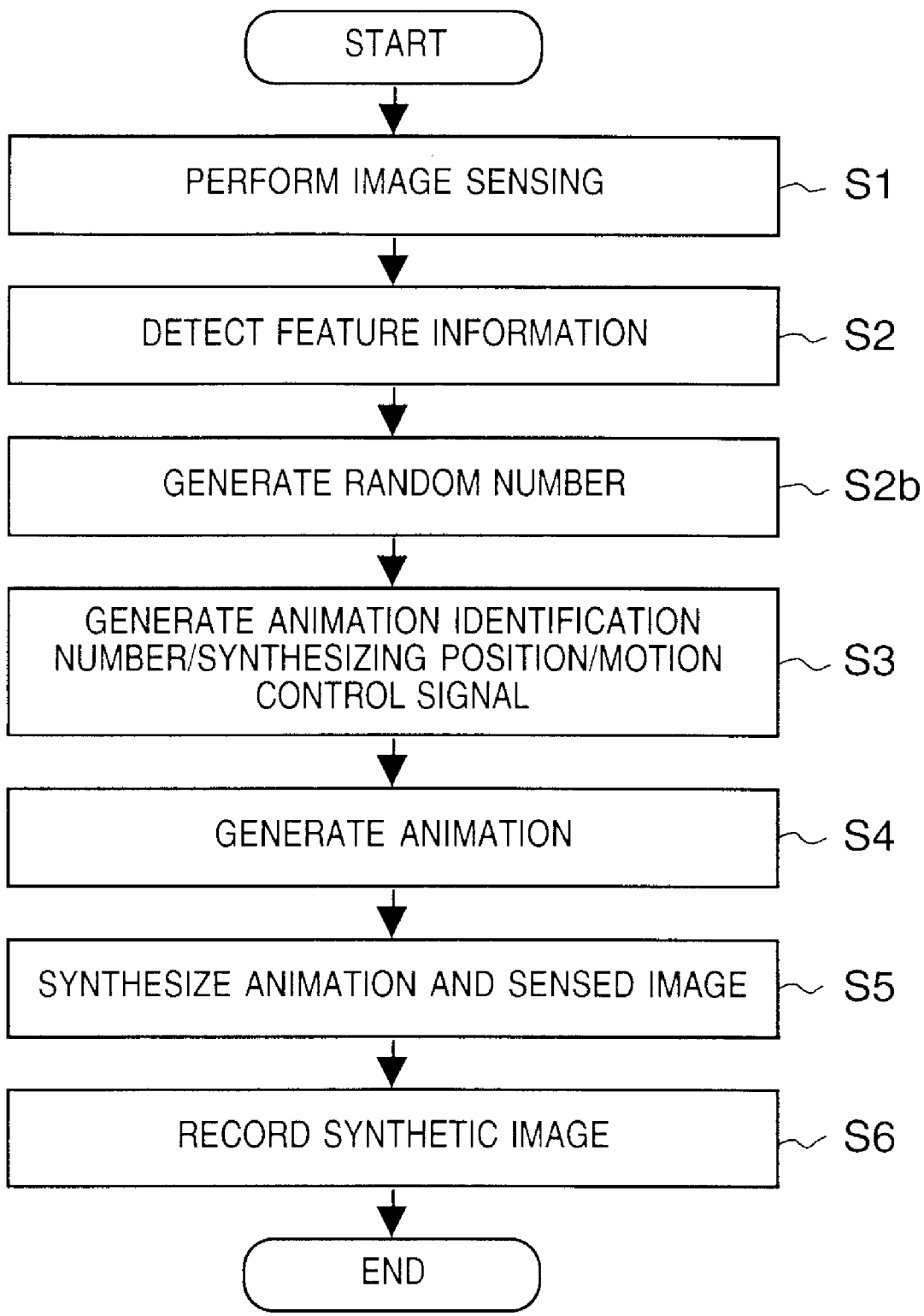
FIG. 15 is a flow chart showing the operation of an image sensing apparatus according to the sixth embodiment.

Referring to FIG. 6, reference numeral 101 denotes an image sensing unit; 102, a synthesizing unit; 103, a recording unit; 104, an animation generating unit; and 105, a detecting unit. These components operate in the same manner as in the first embodiment. The difference between the arrangement of the sixth embodiment and that of the first embodiment resides in a control unit 506 and random number generating unit 507. The functions within a dashed line frame 110 are implemented by software on a processor, and each processing block outside the frame is controlled by signals from the processor. The operation of an arrangement different from that in the first embodiment will be described with reference to the flow chart of FIG. 15.

The control unit in the sixth embodiment determines a control signal on the basis of a random number acquired from the random number generating unit 507 in step S2b in addition to feature information supplied from the detecting unit 105. With this arrangement, a random factor as an unexpected factor influences the generation of an animation to realize an image synthesis effect with high unexpectedness. If, for example, a random number generating unit is added to the above arrangement configured to detect a blue area and generate an animation of a bird, the color of the bird can be changed in accordance with the value of a random number or an accidental nature can be added to an animation such that the bird does not appear until the value of a random number exceeds a predetermined threshold.

(Seventh Embodiment)

Figure 7:
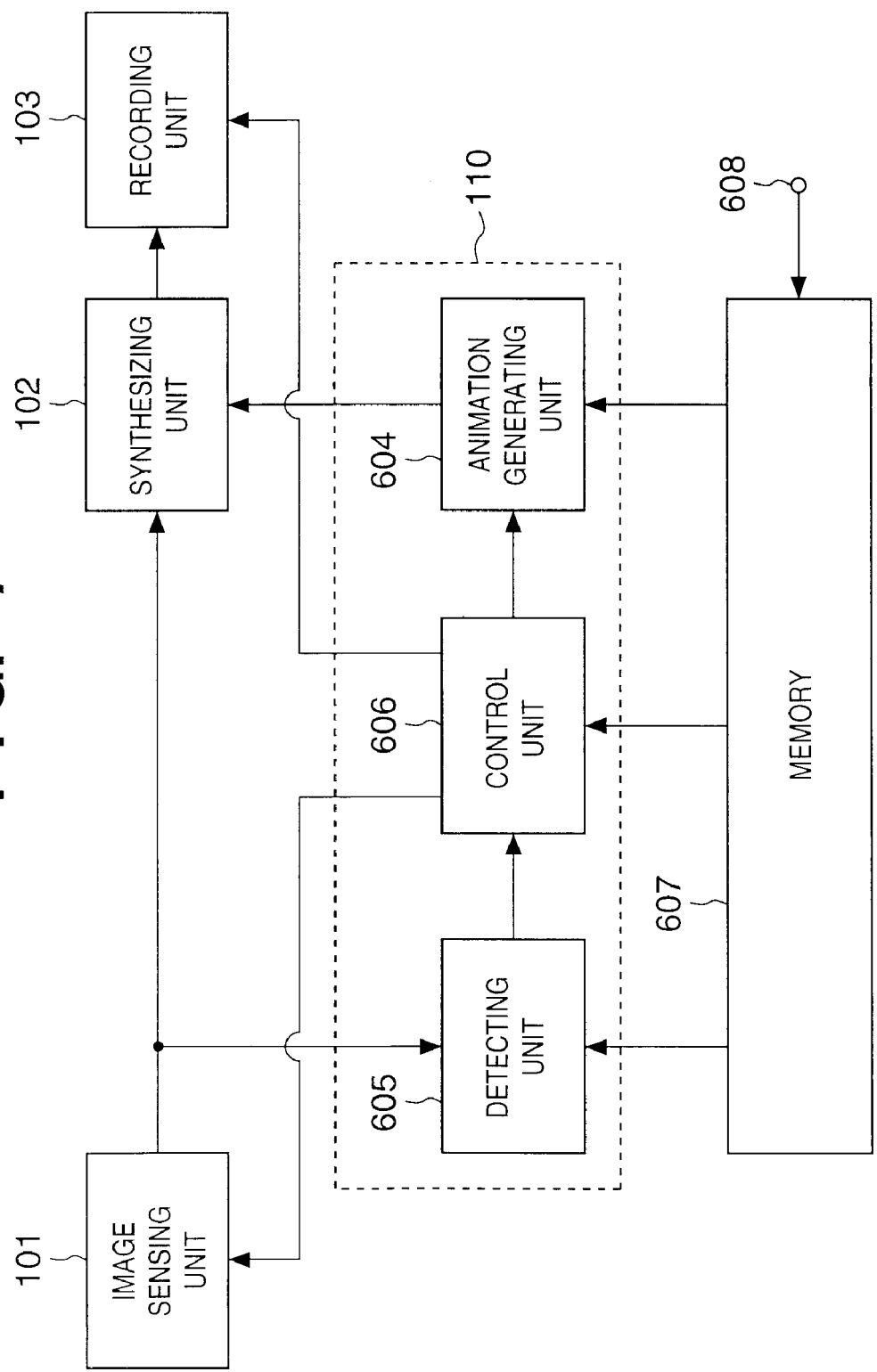
FIG. 7 is a block diagram showing the seventh embodiment of the present invention.

FIG. 7 is a block diagram showing the arrangement of an image sensing apparatus according to the seventh embodiment of the present invention.

Figure 16:
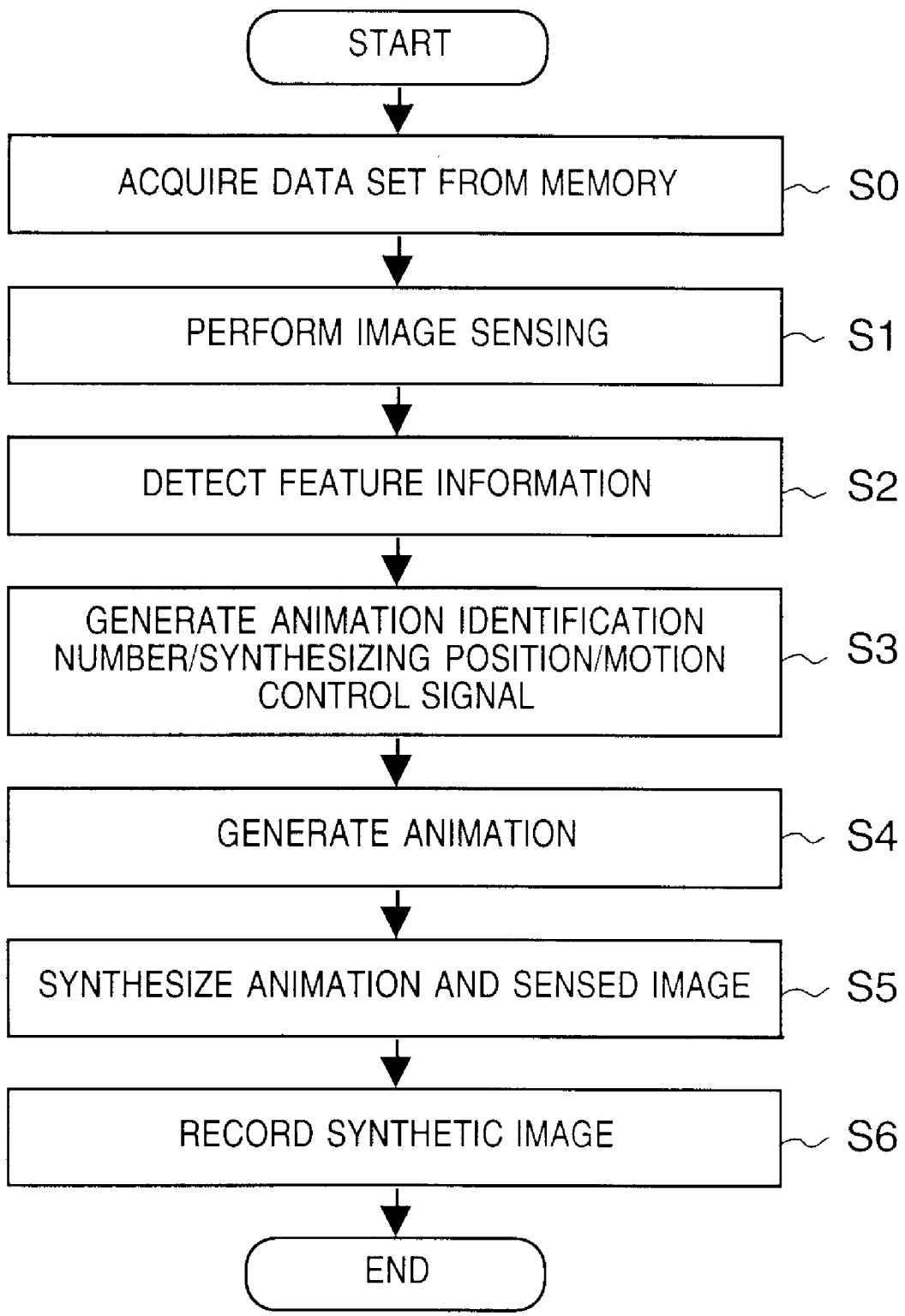
FIG. 16 is a flow chart showing the operation of image sensing apparatuses according to the seventh and eighth embodiments.
Figure 20:
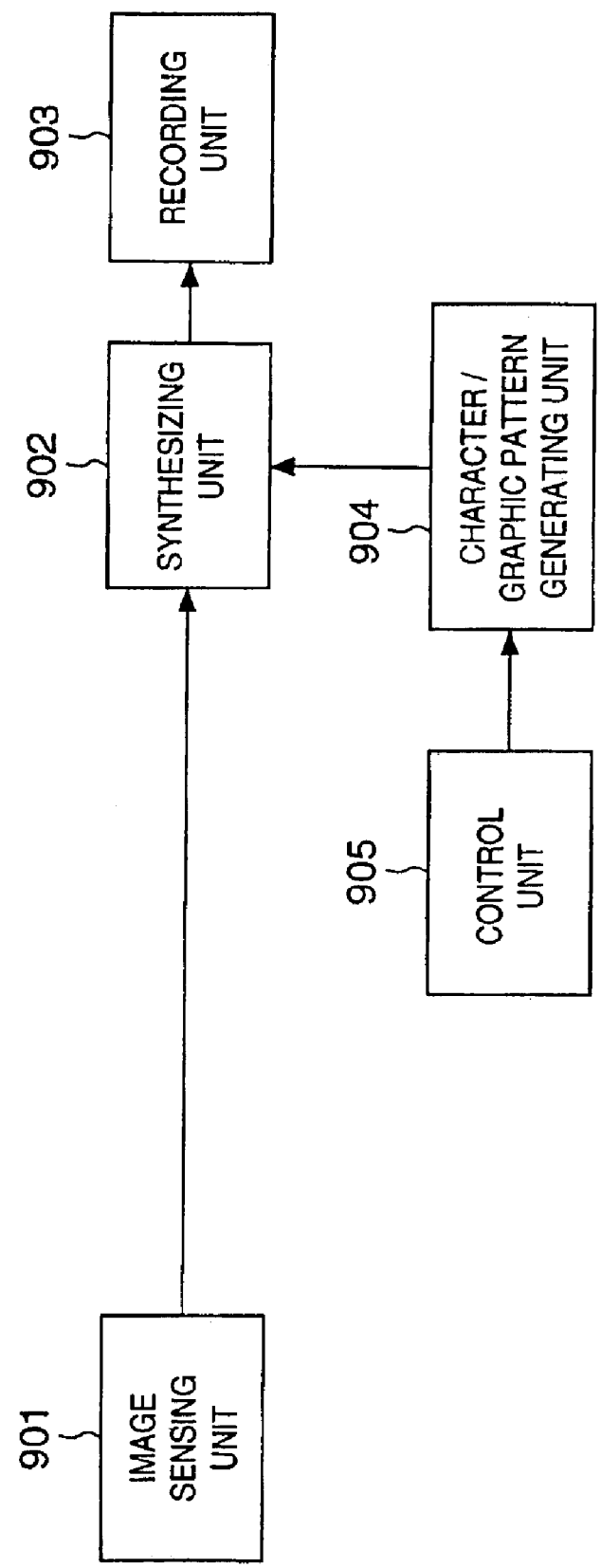
FIG. 20 is a block diagram showing an example of the arrangement of a conventional image sensing apparatus.

Referring to FIG. 7, reference numeral 101 denotes an image sensing unit; 102, a synthesizing unit; and 103, a recording unit. These components operate in the same manner as in the first embodiment. The difference between the arrangement of the seventh embodiment and that of the first embodiment resides in an animation generating unit 604, detecting unit 605, control unit 606, memory 607, and data input terminal 608. The functions within a dashed line frame 110 are implemented by software on a processor, and each processing block outside the frame is controlled by signals from the processor. The operation of an arrangement different from that in the first embodiment will be described with reference to the flow chart of FIG. 16.

In step S0, the detecting unit 605, control unit 606, and animation generating unit 604 in the seventh embodiment respectively acquire a feature to be detected, control rule, and animation data from the data set stored in the memory 607, and perform processing on the basis of the acquired data. Data can be added to or replace the data set stored in the memory 607 through the data input terminal 608. The image sensing apparatus according to the seventh embodiment can therefore add a new synthetic image effect, and hence allows a user to enjoy operating the apparatus without losing interest.

Such a data set can also be implemented as program codes. More specifically, program codes are transferred to the memory 607 through the data input terminal 608. The processor in the image sensing apparatus then executes the program codes, thereby executing detection processing, generating a control signal, or drawing an animation. The addition of image synthesis effects based on such programs realizes great extensibility.

(Eighth Embodiment)

Figure 8:
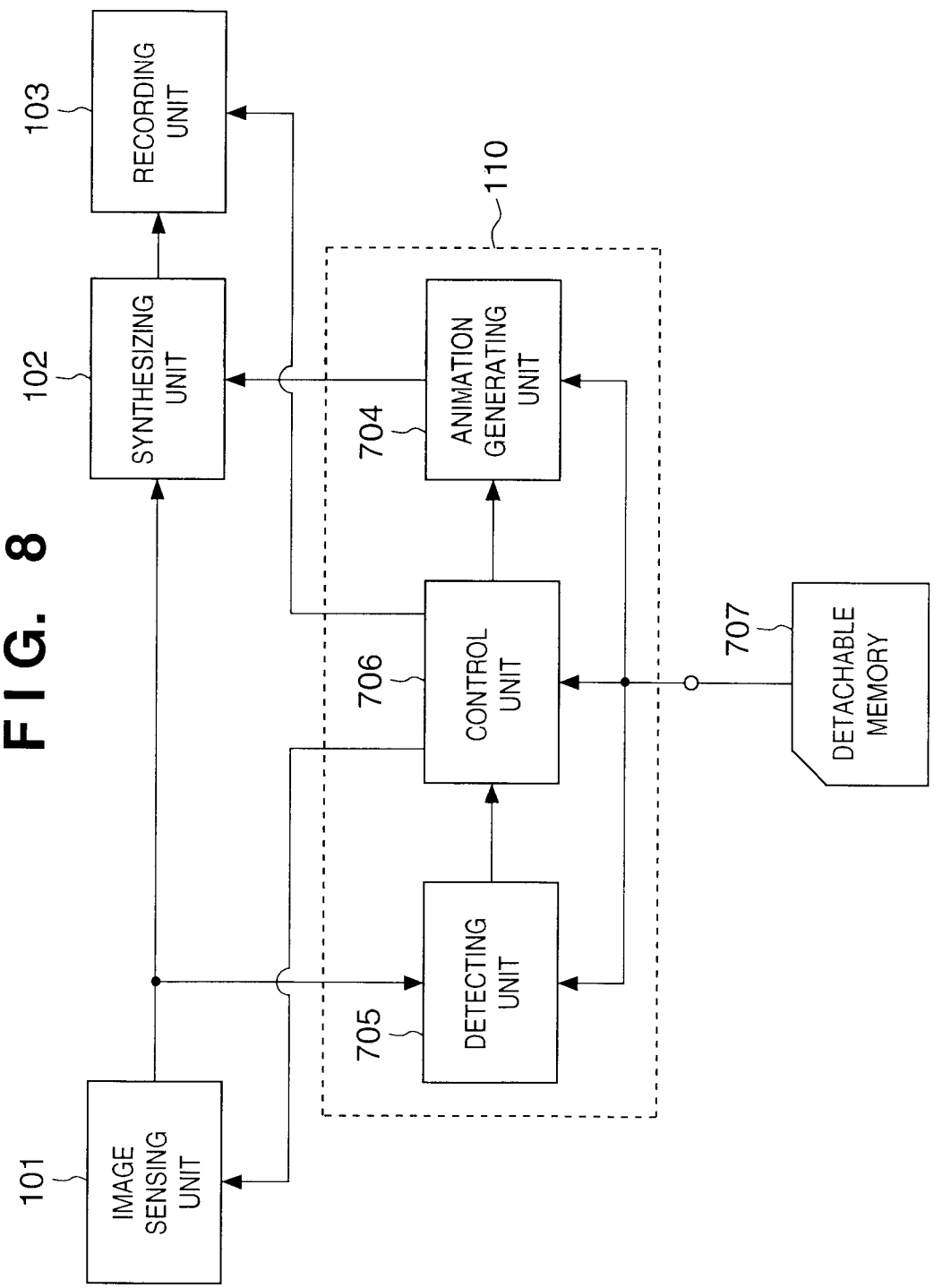
FIG. 8 is a block diagram showing the eighth embodiment of the present invention.

FIG. 8 is a block diagram showing the arrangement of an image sensing apparatus according to the eighth embodiment of the present invention.

Referring to FIG. 8, reference numeral 101 denotes an image sensing unit; 102, a synthesizing unit; and 103, a recording unit. These components operate in the same manner as in the first embodiment. The difference between the arrangement of the eighth embodiment and that of the first embodiment resides in an animation generating unit 704, detecting unit 705, control unit 706, and detachable memory 707. The functions within a dashed line frame 110 are implemented by software on a processor, and each processing block outside the frame is controlled by signals from the processor. The operation of an arrangement different from that in the first embodiment will be described with reference to the flow chart of FIG. 16.

In step S0, the detecting unit 705, control unit 706, and animation generating unit 704 in the eighth embodiment respectively acquire a feature to be detected, control rule, and animation data from the data set stored in the detachable memory 707, and perform processing on the basis of the acquired data. The detachable memory 707 can be detached from this image sensing apparatus. By replacing the detachable memory 707 with another one, the stored data set can be replaced. The image sensing apparatus according to the seventh embodiment can therefore add a new synthetic image effect, and hence allows a user to enjoy operating the apparatus without losing interest.

Such a data set can also be implemented as program codes. More specifically, program codes are recorded on the detachable memory 707. The processor in the image sensing apparatus then executes the program codes, thereby executing detection processing, generating a control signal, or drawing an animation. The addition of image synthesis effects based on such programs realizes great extensibility.

In addition, the detachable memory 707 can also be used as a recording medium on which the recording unit 103 records data.

(Ninth Embodiment)

Figure 9:
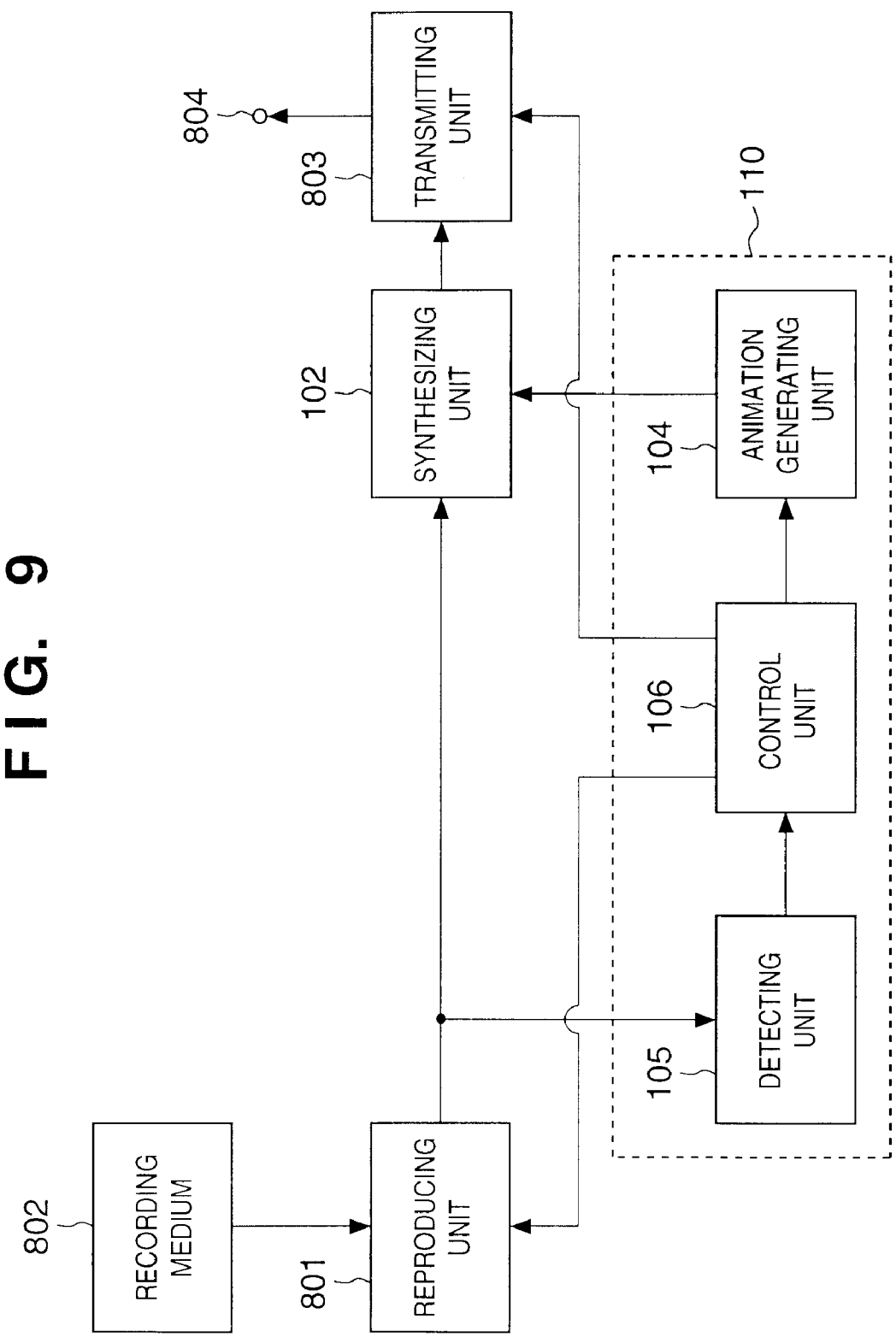
FIG. 9 is a block diagram showing the ninth embodiment of the present invention.

FIG. 9 is a block diagram showing the arrangement of an image sensing apparatus according to the ninth embodiment of the present invention.

Referring to FIG. 9, reference numeral 102 denotes a synthesizing unit; 104, an animation generating unit; 105, a detecting unit; and 106, a control unit. These components operate in the same manner as in the first embodiment. The difference between the arrangement of the ninth embodiment and that of the first embodiment resides in a reproducing unit 801, recording medium 802, transmitting unit 803, and video signal output terminal 804. The operation of the image sensing apparatus having the arrangement shown in FIG. 9 will be described with reference to the flow chart of FIG. 17.

In step S11, the reproducing unit 801 reproduces a video signal recorded on the recording medium 802, and supplies the signal to the synthesizing unit 102 and detecting unit 105. In step S12, the detecting unit 105 detects feature information of the supplied video signal, and supplies the information to the control unit 106. In step S13, upon receiving the feature information supplied from the detecting unit 105, the control unit 106 generates a control signal representing the identification number of an animation image to be generated, the position where the generated animation is synthesized with a picture in accordance with the contents of the received feature information, and the motion of the animation, and supplies the signal to the animation generating unit 104.

In step S14, the animation generating unit 104 generates raster data of an animation in units of frames in accordance with the supplied control signal, and supplies the data to the synthesizing unit 102. In step S15, the synthesizing unit 102 generates a video signal by superimposing the raster data of the animation, supplied from the animation generating unit 104, on the video signal supplied from the reproducing unit 801, and supplies the resultant signal to the transmitting unit 803.

In step S15, the transmitting unit 803 outputs the video signal, supplied from the synthesizing unit 102, to the video signal output terminal 804. The video signal output terminal 804 is connected to a display apparatus such as a TV receiver (not shown) to allow the output video signal to be displayed on a TV screen or the like. Alternatively, by connecting the video signal output terminal 804 to a recording apparatus such as a video recorder (not shown), an output video signal can be recorded on the recording medium.

In the ninth embodiment, a video signal recorded on the recording medium 802 is reproduced. However, a video signal can be input from an image sensing apparatus or reproducing apparatus in a remote place through a communication means.

As in the second embodiment, if the image sensing apparatus or image processing apparatus of the present invention includes a display panel such as a liquid crystal display panel, the special effects obtained by the present invention can be used more effectively. For example, a user can check a synthetic picture by displaying a synthetic video signal on the display panel, or display a picture before synthesis on the display panel to avoid interference with image sensing operation. Alternatively, inappropriate image sensing operation is detected by the detecting unit, and an animation for instructing image sensing operation is synthesized, thereby prompting the user to improve the picture on the display panel.

The user operates the apparatus while seeing synthesis effects on the monitor screen during image sensing operation, and hence can enjoy pseudo-communication with a synthesized animation.

Note that the present invention can also be implemented by combining the respective embodiments or their technical elements, as needed.

It should be noted that the present invention includes combinations of the aforesaid embodiments or technical elements disclosed therein.

Further, the present invention also includes an apparatus, formed by all or a part of the apparatuses disclosed in the embodiments of the present invention, which can be used either individually, with another apparatus, or within another apparatus.

<Other Embodiments>

The present invention can be applied to a system constituted by a plurality of devices (e.g., host computer, interface, camera) or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Furthermore, the program codes may be provided not only from a storage medium, but also through a network, such as the Internet, LAN, WAN, and telephone lines.

In a case where the present invention is applied to the aforesaid storage medium, the storage medium stores program codes corresponding to the flowcharts described in FIG. 10 to 17.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
   an image sensing unit which generates an image signal by sensing an object, wherein the image signal includes a feature of the image signal; and
   a synthesizing unit which detects the feature of the image signal and generates a synthetic signal by automatically superimposing a pre-stored animation signal corresponding to the feature of the image signal with the sensed image signal, wherein the pre-stored animation signal is generated separately from the sensed image signal.

2. The apparatus according to claim 1, wherein said synthesizing unit detects at least one of an intra-frame average of luminance signals, an intra-frame average of chrominance signals, an intra-frame distribution of the luminance signals, an intra-frame distribution of the chrominance signals, an intra-frame distribution of low-frequency components, an intra-frame distribution of high-frequency components, an edge distribution, and a correlation with a specific pattern in the image signal.

3. The apparatus according to claim 1, further comprising a recording unit which records the synthetic signal on a recording medium.

4. The apparatus according to claim 1, wherein said synthesizing unit generates a new animation signal on the basis of a previous animation signal.

5. The apparatus according to claim 1,
   wherein said synthesizing unit generates the animation signal on the basis of time information.

6. The apparatus according to claim 1, further comprising a sound input unit,
   wherein said synthesizing unit generates the animation signal on the basis of a sound signal from said sound input unit.

7. The apparatus according to claim 1 wherein said synthesizing unit generates the animation signal on the basis of random number information.

8. The apparatus according to claim 1, wherein said synthesizing unit comprises a memory unit that stores a plurality of animation signals.

9. The apparatus according to claim 8, further comprising a data input terminal through which data stored in said memory unit can be updated.

10. The apparatus according to claim 8, wherein said memory unit is detectable.

11. The apparatus according to claim 1, wherein said synthesizing unit generates raster data of an animation.

12. The apparatus according to claim 1, wherein said synthesizing unit generates vector data of an animation.

13. The apparatus according to claim 1, wherein said synthesizing unit generates sound data of an animation.

14. The apparatus according to claim 13, further comprising a recording unit which records the sound data and the synthetic signal on a recording medium.

15. The apparatus according to claim 1, further comprising a recording unit that records the synthetic signal and the image signal on a recording medium.

16. The apparatus according to claim 15, further comprising a selecting unit which causes said recording unit to choose between recording the synthetic signal and recording the image signal.

17. The apparatus according to claim 1, further comprising a display unit which displays the synthetic signal and the image signal.

18. The apparatus according to claim 17, further comprising a selecting unit which causes said display unit to choose between displaying the synthetic signal and displaying the image signal.

19. An image processing apparatus comprising:
an input unit which inputs an image signal with a feature of the image signal; and a synthesizing unit that detects the feature of the image signal and generates a synthetic signal by automatically superimposing a pre-stored animation signal corresponding to the feature of the image signal with the sensed image signal, wherein the pre-stored animation signal is generated separately from the sensed image signal.

20. The apparatus according to claim 19, wherein said input unit inputs the image signal from an external image sensing unit.

21. The apparatus according to claim 19, wherein said input unit includes a reproducing unit which reproduces the image signal from a recording medium.

22. The apparatus according to claim 19, wherein said synthesizing unit detects at least one of an intra-frame average of luminance signals, an intra-frame average of chrominance signals, an intra-frame distribution of the luminance signals, an intra-frame distribution of the chrominance signals, an intra-frame distribution of low-frequency components, an intra-frame distribution of high-frequency components, an edge distribution, and a correlation with a specific pattern in the image signal.

23. The apparatus according to claim 19, further comprising a recording unit which records the synthetic image signal on a recording medium.

24. The apparatus according to claim 19, wherein said synthesizing unit generates a new animation signal on the basis of a previous animation signal.

25. The apparatus according to claim 19,
wherein said synthesizing unit generates the animation signal on the basis of time information.

26. The apparatus according to claim 19, further comprising a sound input unit,
wherein said synthesizing unit generates the animation signal on the basis of a sound signal from said sound input unit.

27. The apparatus according to claim 19,
wherein said synthesizing unit generates the animation signal on the basis of random number information.

28. The apparatus according to claim 19, wherein said synthesizing unit comprises a memory unit that stores a plurality of animation signals.

29. The apparatus according to claim 28, further comprising a data input terminal through which data stored in said memory unit can be updated.

30. The apparatus according to claim 28, wherein said memory unit is detachable.

31. The apparatus according to claim 19, wherein said synthesizing unit generates raster data of an animation.

32. The apparatus according to claim 19, wherein said synthesizing unit generates vector data of an animation.

33. The apparatus according to claim 19, wherein said synthesizing unit generates sound data of an animation.

34. The apparatus according to claim 33, further comprising a recording unit which records the sound data and the synthetic signal on a recording medium.

35. The apparatus according to claim 19, further comprising a recording unit that records the synthetic signal and the image signal.

36. The apparatus according to claim 35, further comprising a selecting unit which causes said recording unit to choose between recording the synthetic signal and recording the image signal.

37. The apparatus according to claim 19, further comprising a display unit which displays the synthetic signal and the image signal.

38. The apparatus according to claim 37, further comprising a selecting unit which causes said display unit to choose between displaying the synthetic signal and displaying the image signal.

39. An sensing method comprising:
an image sensing step of generating an image signal by sensing an object, wherein the image signal includes a feature of the image signal; and
a synthesizing step of detecting the feature of the image signal and generating a synthetic signal by automatically superimposing a pre-stored animation signal corresponding to the feature of the image signal with the sensed image signal, wherein the pre-stored animation signal is generated separately from the sensed image signal.

40. The method according to claim 39, wherein the synthesizing step comprises detecting at least one of an intra-frame average of luminance signals, an intra-frame average of chrominance signals, an intra-frame distribution of the luminance signals, an intra-frame distribution of the chrominance signals, an intra-frame distribution of low-frequency components, an intra-frame distribution of high-frequency components, an edge distribution, and a correlation with a specific pattern in the image signal.

41. The method according to claim 39, further comprising a recording step of recording the synthetic image signal on a recording medium.

42. The method according to claim 39, wherein a new animation signal is generated in said synthesizing step on the basis of a previous animation signal.

43. The method according to claim 39,
wherein the synthesizing step comprises generating the animation signal on the basis of time information.

44. The method according to claim 39, further comprising a sound input step,
wherein the synthesizing step comprises generating the animation signal on the basis of a sound signal in the sound input step.

45. The method according to claim 39,
wherein said synthesizing step comprises generating the animation signal on the basis of a random number information.

46. The method according to claim 39, wherein said synthesizing unit comprises a memory step of storing a plurality of animation signals.

47. The method according to claim 39, wherein the synthesizing step comprises generating raster data of an animation.

48. The method according to claim 39, wherein the synthesizing step comprises generating vector data of an animation.

49. The method according to claim 39, wherein the synthesizing step comprises generating sound data of an animation.

50. The method according to claim 49, further comprising a recording step of recording the sound data.

51. The method according to claim 39, comprising a recording step of recording the synthetic signal on a recording medium.

52. The method according to claim 51, wherein the recording step comprises recording the synthetic signal and the image signal.

53. The method according to claim 51, comprising a selecting step of choosing between recording the synthetic signal and recording the image signal before synthesis in the recording step.

54. The method according to claim 39, further comprising a display step of displaying the synthetic signal and the image signal.

55. The method according to claim 54, further comprising a selecting step of choosing between displaying the synthetic signal and displaying the image signal.

56. An image synthesizing method comprising:
an input step of inputting an image signal with a feature of the image signal; and
a synthesizing step of detecting the feature of the image signal and generating a synthetic signal by automatically superimposing a pre-stored animation signal corresponding to the feature of the image signal with the sensed image signal, wherein the pre-stored animation signal is generated separately from the sensed image signal.

57. The method according to claim 56, wherein the input step comprises inputting an image signal from an external image sensing unit.

58. The method according to claim 56,
wherein the synthesizing step comprises generating the animation signal on the basis of time information.

59. The method according to claim 56, wherein the input step comprises reproducing the image signal from a recording medium.

60. The method according to claim 56, wherein the synthesizing step comprises detecting at least one of an intra-frame average of luminance signals, an intra-frame average of chrominance signals, an intra-frame distribution of the luminance signals, an intra-frame distribution of the chrominance signals, an intra-frame distribution of low-frequency components, an intra-frame distribution of high-frequency components, an edge distribution, and a correlation with a specific pattern in the image signal.

61. The method according to claim 56, further comprising a recording step of recording the synthetic signal on a recording medium.

62. The method according to claim 56, wherein a new animation signal is generated in said synthesizing step on the basis of a previous animation signal.

63. The method according to claim 56, further comprising a sound input step,
wherein the synthesizing step comprises generating the animation signal on the basis of a sound signal in the sound input step.

64. The method according to claim 56,
wherein the synthesizing step comprises generating the animation signal on the basis of a random number information.

65. The method according to claim 56, wherein said synthesizing step comprises a memory step of storing a plurality of animation signals.

66. The method according to claim 56, wherein the synthesizing step comprises generating raster data of an animation.

67. The method according to claim 56, wherein the synthesizing step comprises generating vector data of an animation.

68. The method according to claim 56, wherein the synthesizing step comprises generating sound data of an animation.

69. The method according to claim 68, further comprising a recording step of recording the sound data on a recording medium.

70. The method according to claim 56, comprising a recording step of recording the synthetic signal on a recording medium.

71. The method according to claim 70, wherein the recording step comprises recording the synthetic signal and the image signal.

72. The method according to claim 70, comprising a selecting step of choosing between recording the synthetic signal and recording the image signal before synthesis in the recording step.

73. The method according to claim 56, further comprising a display step of displaying the synthetic signal and the image signal.

74. The method according to claim 73, further comprising a selecting step of choosing between displaying the synthetic signal and displaying the image signal.

75. A recording medium holding a computer-readable program including:
a program code for generating an image signal by sensing an object, wherein the image signal includes a feature of the image signal; and
a program code for detecting the feature of the image signal and generating a synthetic signal by automatically superimposing a pre-stored animation signal corresponding to the feature of the image signal with the sensed image signal, wherein the pre-stored animation signal is generated separately from the sensed image signal.

76. A recording medium holding a computer-readable program including:
a program code for inputting an image signal with a feature of the image signal; and
a program code for detecting the feature of the image signal and generating a synthetic signal by automatically superimposing a pre-stored animation signal corresponding to the feature of the image signal with the sensed image signal, wherein the pre-stored animation signal is generated separately from the sensed image signal.

* * * * *

UNITED STATES PATENT AND TRADEMARK OFFICE
CERTIFICATE OF CORRECTION

| | |
|---|---|
| PATENT NO. | : 7,167,179 B2 |
| APPLICATION NO. | : 09/732368 |
| DATED | : January 23, 2007 |
| INVENTOR(S) | : Nozawa |

It is certified that error appears in the above-identified patent and that said Letters Patent is hereby corrected as shown below:

In col. 1, line 9, replace "imaging" with --image--.

In col. 3, line 2, replace "digram" with --diagram--.

In col. 3, line 2, replace "of of" with --of an--.

In Claim 10 (col. 10, line 48), replace "detectable" with --detachable--.

Signed and Sealed this

Fifth Day of June, 2007

JON W. DUDAS
*Director of the United States Patent and Trademark Office*